United States Patent
Du et al.

(10) Patent No.: US 9,632,783 B2
(45) Date of Patent: Apr. 25, 2017

(54) OPERAND CONFLICT RESOLUTION FOR REDUCED PORT GENERAL PURPOSE REGISTER

(71) Applicant: QUALCOMM Incorporated, San Diego, CA (US)

(72) Inventors: Yun Du, San Diego, CA (US); Hongjiang Shang, San Diego, CA (US); Haikun Zhu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 328 days.

(21) Appl. No.: 14/505,854

(22) Filed: Oct. 3, 2014

(65) Prior Publication Data
US 2016/0098276 A1 Apr. 7, 2016

(51) Int. Cl.
*G06F 9/30* (2006.01)
*G06F 9/38* (2006.01)

(52) U.S. Cl.
CPC ........ *G06F 9/30145* (2013.01); *G06F 9/3012* (2013.01); *G06F 9/3017* (2013.01); *G06F 9/30141* (2013.01); *G06F 9/30181* (2013.01); *G06F 9/30189* (2013.01); *G06F 9/383* (2013.01); *G06F 9/3832* (2013.01); *G06F 9/3885* (2013.01); *G06F 9/3887* (2013.01)

(58) Field of Classification Search
None
See application file for complete search history.

(56) References Cited

U.S. PATENT DOCUMENTS

| | | | | |
|---|---|---|---|---|
| 4,737,933 A | * | 4/1988 | Chiang | G06F 9/30 326/36 |
| 5,488,730 A | | 1/1996 | Brown, III et al. | |
| 5,560,039 A | * | 9/1996 | Dulong | G06F 9/3001 708/521 |
| 5,752,069 A | * | 5/1998 | Roberts | G06F 9/3004 711/128 |

(Continued)

FOREIGN PATENT DOCUMENTS

| | | | |
|---|---|---|---|
| EP | 0735463 A2 | 10/1996 | |
| WO | WO 0229564 A2 * | 4/2002 | .......... G06F 8/4442 |

(Continued)

OTHER PUBLICATIONS

International Search Report and Written Opinion—PCT/US2015/053693—ISA/EPO—Jan. 21, 2016, 15 pp.

(Continued)

*Primary Examiner* — Steven Snyder
(74) *Attorney, Agent, or Firm* — Shumaker & Seiffert, P.A.

(57) ABSTRACT

Techniques are described for determining whether execution of an instruction would require reading more values from a memory cell of a general purpose register (GPR) than a read port of the memory cell would allow. In such a case, the techniques may store, prior to execution of the instruction, one or more values from the memory cell in a separate conflict queue. During execution of the instruction to implement an operation defined by the instruction, one value that is an operand of the operation would be read from the memory cell and another value that is an operand of the operation other would be read from the conflict queue.

20 Claims, 6 Drawing Sheets

(56) References Cited

U.S. PATENT DOCUMENTS

| | | | | |
|---|---|---|---|---|
| 5,790,823 | A * | 8/1998 | Puzak | G06F 9/383 |
| | | | | 711/E12.057 |
| 5,822,559 | A * | 10/1998 | Narayan | G06F 9/30152 |
| | | | | 712/213 |
| 5,854,921 | A * | 12/1998 | Pickett | G06F 9/3802 |
| | | | | 711/E12.057 |
| 5,854,934 | A | 12/1998 | Hsu et al. | |
| 5,860,104 | A * | 1/1999 | Witt | G06F 9/3004 |
| | | | | 711/126 |
| 5,892,936 | A * | 4/1999 | Tran | G06F 9/30101 |
| | | | | 712/212 |
| 5,919,256 | A * | 7/1999 | Widigen | G06F 9/383 |
| | | | | 711/100 |
| 5,933,618 | A * | 8/1999 | Tran | G06F 9/30152 |
| | | | | 712/212 |
| 5,987,561 | A * | 11/1999 | Witt | G06F 9/3004 |
| | | | | 711/128 |
| 6,119,203 | A * | 9/2000 | Snyder | G06F 9/30043 |
| | | | | 711/137 |
| 6,223,279 | B1 * | 4/2001 | Nishimura | G06F 9/462 |
| | | | | 712/228 |
| 6,324,643 | B1 * | 11/2001 | Krishnan | G06F 9/30058 |
| | | | | 712/237 |
| 6,374,348 | B1 | 4/2002 | Irie et al. | |
| 7,681,018 | B2 * | 3/2010 | Wolrich | G06F 9/3851 |
| | | | | 712/215 |
| 2003/0005419 | A1 | 1/2003 | Pieper et al. | |
| 2003/0200422 | A1 | 10/2003 | Hironaka et al. | |
| 2006/0230236 | A1 * | 10/2006 | Finkelstein | G06F 12/0862 |
| | | | | 711/137 |
| 2008/0291767 | A1 * | 11/2008 | Barnes | H01L 21/8221 |
| | | | | 365/230.05 |
| 2009/0287903 | A1 | 11/2009 | Hsu et al. | |
| 2011/0072243 | A1 | 3/2011 | Qiu et al. | |
| 2013/0159628 | A1 | 6/2013 | Choquette et al. | |
| 2015/0039867 | A1 * | 2/2015 | Blomgren | G06F 9/384 |
| | | | | 712/225 |
| 2015/0058573 | A1 * | 2/2015 | Blomgren | G06F 9/30043 |
| | | | | 711/125 |

FOREIGN PATENT DOCUMENTS

| | | |
|---|---|---|
| WO | 2006039613 A1 | 4/2006 |
| WO | 2013101114 A1 | 7/2013 |
| WO | WO 2013101114 A1 * 7/2013 | ............ G06F 9/3867 |

OTHER PUBLICATIONS

Second Written Opinion from corresponding PCT Application Serial No. PCT/US2015/053693 dated Sep. 12, 2016 (5 pages).

International Preliminary Report on Patentability from corresponding PCT Application Serial No. PCT/US2015/053693 dated Dec. 5, 2016 (10 pages).

* cited by examiner

OPERAND CONFLICT RESOLUTION FOR REDUCED PORT GENERAL PURPOSE REGISTER

TECHNICAL FIELD

This disclosure relates to data storage, and more particularly, to data storage techniques in registers.

BACKGROUND

Processing units, such as graphics processing units (GPUs), include processing elements and a general purpose register (GPR) that stores data for the execution of an instruction. In some examples, a processing element executes instructions for processing one item of data, and respective processing elements store the data of the item or the resulting data of the item from the processing in the GPR. An item of data may be the base unit on which processing occurs. For instance, in graphics processing, a vertex of a primitive is one example of an item, and a pixel is another example of an item. There is graphics data associated with each vertex and pixel (e.g., coordinates, color values, etc.). There may be multiple processing elements within a processor core of the processing element allowing for parallel execution of an instruction (e.g., multiple processing elements execute the same instruction at the same time).

SUMMARY

In general, the disclosure describes techniques for resolving operand conflicts prior to execution, where such operand conflicts may arise in general purpose registers (GPRs) that include a plurality of memory cells with few write/read ports (e.g., one write port and one read port). A design of a GPR that includes a plurality of memory cells, each with few write/read ports may be scalable for various types of circuits and technologies. However, due to the limited number of write/read ports for each memory cell, operand conflicts may result where multiple values are being read from or written to the same memory cell at the same time. In other words, an operand conflict arises where execution of an instruction may cause simultaneous (e.g., in parallel) reading of more values from a memory cell that a read port of the memory cell can output.

In accordance with the techniques described in disclosure, if multiple values are to be read from the same memory cell at the same time, prior to execution of the instruction, a controller may store at least one of the values stored in the memory cell in a conflict queue to avoid the simultaneous reading of more values from the memory cell than the read port of the first memory cell can support. For instance, if the memory cell includes only one read port and if execution of an instruction would cause the reading of more than one value from the read port at the same time, a controller may store values from the memory cell, prior to execution of the instruction, in a conflict queue such that during execution of the instruction, only one value is read from memory cell and the other values are read from the conflict queue, thereby avoiding the operand conflict.

In one example, the disclosure describes a method of processing values, the method comprising determining whether execution of an instruction would cause simultaneous reading of more values from a first memory cell of a plurality of memory cells of a general purpose register (GPR) than a read port of the first memory cell can output, wherein values stored in the first memory cell cannot be accessed via any of the other memory cells of the GPR, prior to execution of the instruction, storing one or more values stored in the first memory cell in a conflict queue separate from the GPR based on the determination that execution of the instruction would cause simultaneous reading of more values from the first memory cell than the read port of the first memory cell can output, and executing the instruction to implement an operation defined by the instruction that uses at least one value from the first memory cell and at least one value from the conflict queue as operands.

In one example, the disclosure describes a device for processing value, the device comprising a general purpose register (GPR) comprising a plurality of memory cells that includes a first memory cell having a read port, wherein values stored in the first memory cell cannot be accessed via any of the other memory cells of the GPR, and a graphics processing unit (GPU). The GPU is configured to determine whether execution of an instruction would cause simultaneous reading of more values from the first memory cell than the read port of the first memory cell can output, prior to execution of the instruction, store one or more values stored in the first memory cell in a conflict queue separate from the GPR based on the determination that execution of the instruction would cause simultaneous reading of more values from the first memory cell than the read port of the first memory cell can output, and execute the instruction to implement an operation defined by the instruction that uses at least one value from the first memory cell and at least one value from the conflict queue as operands.

In one example, the disclosure describes a computer-readable storage medium having instructions stored thereon that when executed by one or more processors cause the one or more processors to determine whether execution of an instruction would cause simultaneous reading of more values from a first memory cell of a plurality of memory cells of a general purpose register (GPR) than a read port of the first memory cell can output, wherein values stored in the first memory cell cannot be accessed via any of the other memory cells of the GPR, prior to execution of the instruction, store one or more values stored in the first memory cell in a conflict queue separate from the GPR based on the determination that execution of the instruction would cause simultaneous reading of more values from the first memory cell than the read port of the first memory cell can output, and execute the instruction to implement an operation defined by the instruction that uses at least one value from the first memory cell and at least one value from the conflict queue as operands.

In one example, the disclosure describes a device for processing value, the device comprising a general purpose register (GPR) comprising a plurality of memory cells that includes a first memory cell having a read port, wherein values stored in the first memory cell cannot be accessed via any of the other memory cells of the GPR, and a graphics processing unit (GPU). The GPU comprises means for determining whether execution of an instruction would cause simultaneous reading of more values from the first memory cell than the read port of the first memory cell can output, means for storing, prior execution of the instruction, one or more values stored in the first memory cell in a conflict queue separate from the GPR based on the determination that execution of the instruction would cause simultaneous reading of more values from the first memory cell than the read port of the first memory cell can output, and means for executing the instruction to implement an operation defined by the instruction that uses at least one value from the first memory cell and at least one value from the conflict queue as operands.

The details of one or more examples are set forth in the accompanying drawings and the description below. Other features, objects, and advantages will be apparent from the description, drawings, and claims.

DETAILED DESCRIPTION

Figure 1:
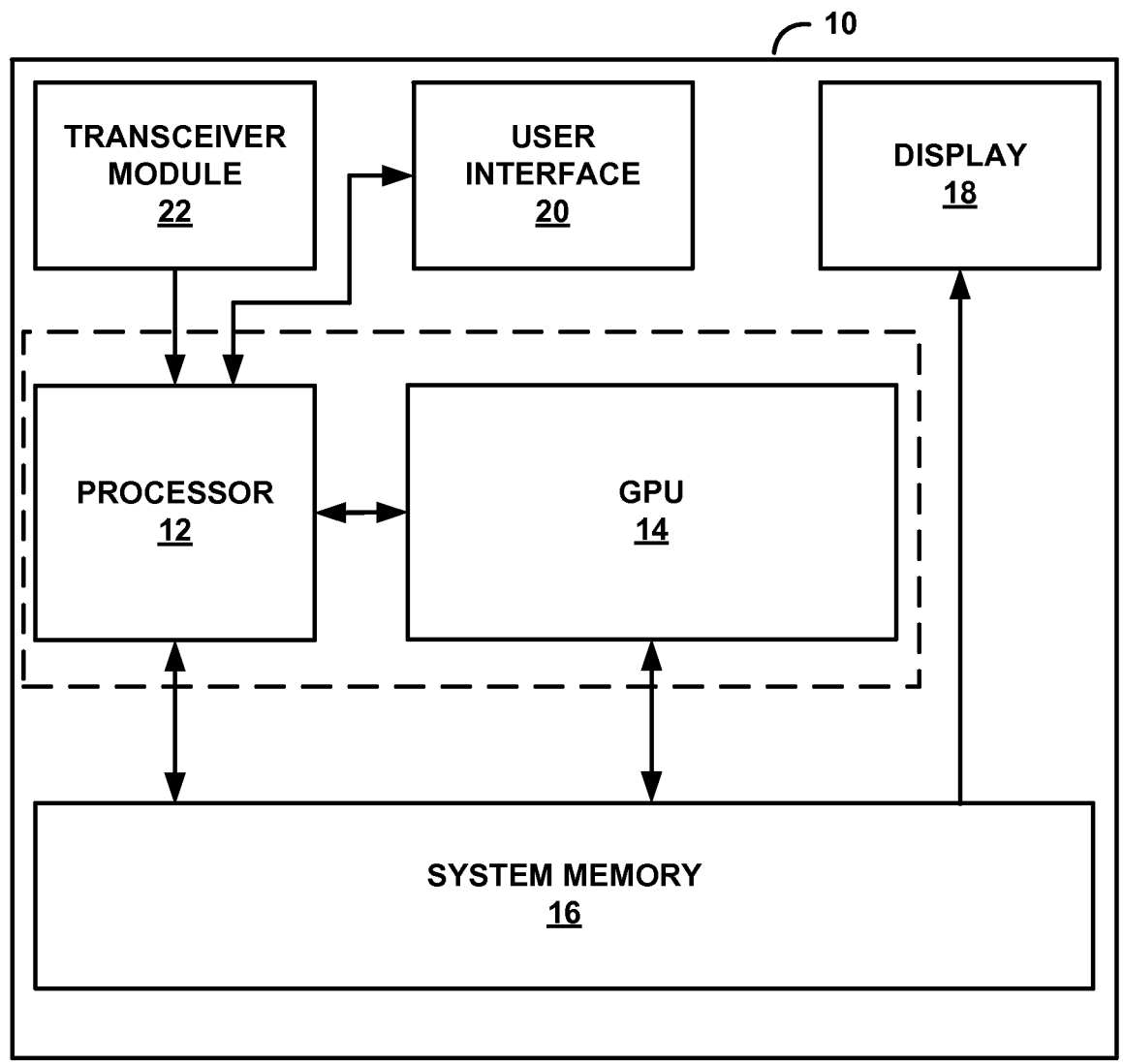
FIG. 1 is a block diagram illustrating an example device for processing data in accordance with one or more example techniques described in this disclosure.

Parallel processing units, such as graphics processing unit (GPUs) that are configured to perform many operations in parallel (e.g., at the same time), include one or more processor cores (e.g., shader cores for a GPU) that execute instructions of one or more programs. For ease of description, the techniques described in the disclosure are described with respect to a GPU or a general purpose GPU (GPGPU). However, the techniques described in this disclosure may be extended to parallel processing units that are not necessarily GPUs or GPGPUs, as well as non-parallel processing units (e.g., ones not specifically configured for parallel processing).

The GPU includes one or more general purpose registers (GPRs) for value storage, such as input values (referred to as operands or operand values) for instructions executing on the GPU or output values generated from the execution of the instructions. In some cases, the output values generated from one instruction become input values (e.g., operand values) to a subsequent instruction.

GPUs that implement multi-threading systems tend to include multiple read/write port GPRs. As an example, a GPR may include more than four ports such as four write ports and four read ports (4W4R), for a total of eight ports. For instance, to provide parallel processing capabilities, GPUs may be configured to execute multiple instances of a same program (referred to as a shader) in parallel. One instruction of one instance of the program is referred to as a thread. Having multiport GPRs may enable efficient shader execution with increase resource utilization by reducing thread life cycles. For example, in the 4W4R GPR example, four threads may be able read operand values simultaneously, resulting in fewer threads waiting turns to be able to read from the GPR.

One way to design a GPR is with a single memory cell with multiple read/write ports. For example, the memory cell may be considered as a two-dimensional memory cell that can store n bits horizontally, and m bits vertically (i.e., n-bits wide, and m-bits deep). As one example, the GPR may include a single memory cell that is 256 bits deep and 128 bits wide (i.e., 256×128). In this example, the memory cell may be configured with two writes ports and four reads ports (2W4R).

A multi-port single memory cell GPR is generally designed for specific circuitry. For example, the 2W4R single memory cell GPR may be well suited for a specific type of the GPU that uses the four read ports for arithmetic logic units (ALUs) with three operands, an elementary function unit (EFU), a texture sample unit, a memory load/store unit, and an output unit, and uses the two write ports for writing the results of the ALUs, the EFU, the texture sample unit, the memory load/store unit, and an input unit. One of the benefits of multi-port single memory cell GPRs is that multiple units can simultaneously access the data. For instance, a value that is to be read can be read from any of the four ports.

However, there are disadvantages of using such a multi-port single memory cell GPR designed for specific circuitry. As one example, the area and power cost per bit is relatively high. The area and power cost per bit may be considered as a measure of the number of transistors needed to process a digital bit.

Also, because such a multi-port single memory cell GPR is designed for specific circuitry, the GPR may not migrate well. For example, as transistor technology changes, the GPR structure may not scale well. As another example, such a multi-port single memory cell GPR may not function well as a basic memory block that can be used to form a GPR that is well suited for another circuit. For example, the design for the 256 deep, 128 wide single memory cell GPR with four read ports and two write ports may not function well as a basic block from which a GPR that is well suited for a different circuit can be formed.

This disclosure describes a GPR that includes a plurality of distinct, separate standard memory cells (referred to as macros or memory banks) with limited read/write ports that together, with input and output crossbars, form the GPR. A standard memory cell, in the GPR of this disclosure, may be a basic building block that can be used to form various types of GPRs. As one example, each memory cell may be a single write/single read (i.e., include only one write port and one only read port (1W1R)), however, other number of ports is possible, but are generally less than conventional sizes such as 2W4R.

Also, each memory cell may be configured to store fewer values than a memory cell of a special designed GPR. For instance, in the above example of the GPR designed for specialized circuitry, the memory cell was 256 bits deep, and 128 bits wide. In some examples, a memory cell of a GPR, in accordance with examples described in this disclosure, may be 64 bits deep, and 128 bits wide. In this example, four 64 bits deep by 128 bits wide memory cells together store as much data as one 256 bits deep by 128 bits wide memory cell.

In this way, a GPR of this disclosure may be considered as a specially designed GPR split into multiple memory cells with fractional capacity. For instance, in the above example, each memory cell that is 64 bits deep by 128 bits wide has one-fourth the capacity of the 256 bits deep by 128 bits wide memory cell.

In addition, the GPR of this disclosure may include input and output crossbars. The input crossbar may be considered as a switch that interconnects units that write to the memory cells with the memory cells. The output crossbar may be considered as a switch that interconnects units that read from the memory cells with the memory cells.

For instance, to emulate the four read/two write, 256 bits deep by 128 bits wide, single memory cell GPR, a GPR, in accordance with this disclosure, includes four 64 bits deep by 128 bits wide memory cells. The GPR also includes a 4×4 output crossbar so that four reads can be performed on the four memory cells, and includes a 2×4 input crossbar so that two writes can be performed on the four memory cells.

While using smaller memory cells with fewer ports and crossbars allows for ease of migration, there may be certain limitations. For instance, because each of the memory cells is distinct and separate, values stored in one of the memory cells may only be readable from the port of that memory cell. In this case, if two values are to be read from the same memory cell, or if the same value is to be read by two different units at the same time, a conflict would occur because the single read port of the memory cell may not be able to output two values at the same time or output the same value to two different units at the same time.

For instance, while the GPR, in the examples described in this disclosure, may include multiple ports (e.g., the input and output crossbars may provide the GPR with four read ports and two write ports), each individual memory cell may have limited ports. As an example, input and output cross bars and four memory cells each having one read port and one write port can be used to form a GPR with four read ports and two writes port. However, operand conflicts would exist in reading multiple values from the same memory cell at the same time.

In accordance with the techniques described in this disclosure, a conflict detection unit may be configured to determine, prior to execution of an instruction, whether execution of the instruction will cause a conflict at a port of one of the plurality of distinct memory cells within the GPR. In other words, the conflict detection unit may determine whether execution of an instruction would cause simultaneous reading of more values from a first memory cell of a plurality of memory cells of a GPR than a read port of the first memory cell can output. If determined that execution will cause a conflict, a conflict resolver unit or a processing element may store one of the values from the memory cell in a conflict queue. The conflict queue may be local to a processing element that is to execute the instruction that would cause the conflict.

In this disclosure, in some cases, execution of an instruction causing simultaneous reading of more values from a memory cell than a read port of the memory cell can output may mean that multiple instructions are to be executed and the simultaneous execution of the instructions would result in reading more values than the read port can output. In this sense, it is execution of an instruction that would result in simultaneous reading. For instance, if there are two instructions to be executed in parallel, then the execution of an instruction, in conjunction with the other, would result in reading more values than the read port can support (assuming the read port can support one read at a time), but if only one of the instructions were executed than there would be no conflict.

Also, in some cases, execution of an instruction causing simultaneous reading of more values from a memory cell than a read port of the memory cell can output may also mean that one instruction requires reading of multiple values simultaneously which would cause the reading of more value than a read port of the memory cell can output. As one example, one instruction may require multiple reads. As another example, one instruction may include a plurality of sub-instructions that are each directed to reading from the same memory cell. For instance, execution of instruction causing simultaneous reading of more values from a memory cell than a read port of the memory cell can output may be considered as a situation where execution of an instruction (in conjunction with other instructions or otherwise) would result in requiring to read more values from the read port of the memory cell in the same clock cycle than the read port can output.

As an illustrative example, assume that execution of an instruction would cause a processing element to read value A and value B simultaneously from a first memory cell of a plurality of memory cells. In this example, a conflict detection unit may determine, prior to execution of the instruction, that reading value A and value B simultaneously will cause a conflict (e.g., would cause simultaneous reading of more values from the first memory cell than a read port of the first memory cell can output). In turn, a conflict resolver unit may store one of value A or value B (assume value A in this example) in a conflict queue of the processing element. Then, when the processing element executes the instruction, the processing element is able to read value B from the first memory cell and read value A from the conflict queue, thereby mitigating the conflict. Because value A and value B are being read from different locations, the processing element may be able to read value A and value B in the same clock cycle.

In this manner, the techniques described in this disclosure allow for a GPR to be constructed from constituent basic memory cells while minimizing operand conflicts. For instance, if a conflict arises, then some other techniques use a "No Operation" (NOP) command to wait for access to the values. With a GPR formed with a plurality of separate, distinct memory cells, whose values can only be accessed by their ports and no other ports, the chances that a conflict will arise increases, and the techniques described in this disclosure mitigate some of the conflict situations to increase computational efficiency (i.e., reduce the number of clock cycles needed to complete a computation).

Moreover, because the conflict resolver stored a conflict value in the conflict queue, prior to execution of the instruction, additional read/write ports may be available during execution. For instance, in the above example, the processing element may originally be required to use two ports of the GPR, one to read value A and one to read value B. However, because conflict detection unit determined that a conflict would result, the conflict resolver unit stored value A prior to execution. This means that one of the ports of the GPR will be used to read value B during execution, and the port that would have been used to read value A is unused.

In some examples, to avoid wasting the unused port of the GPR, a processing element may pre-fetch values for a subsequent instruction, during execution of a current instruction, and store the pre-fetched values in a pre-fetch queue. Pre-fetching of values in the pre-fetch queue and storing of values in the conflict queue should not be confused. The storing of values in the conflict queue is performed prior to execution of a current instruction by a processing element for which a conflict would arise, so that a value is available from a different source than the memory cell for which there would be a conflict. The pre-fetching of values is performed during the execution of the current instruction to fetch values that will be needed for subsequent instructions because the storing of values in the conflict queue frees ports of the GPR from which to read or write values.

As an illustrative example, assume a GPR includes two distinct, separate memory cells, and includes two read ports. In this example, assume the first memory cell includes values A and B, and the second memory cell includes value C. Also, assume that an instruction would cause a processing element to read values A and B at the same time. In this example, similar to above, a conflict resolver unit may store one of values A or value B (assume value A in this example) in a conflict queue of the processing element. When the processing element executes the instruction, the processing element will use a first of the two ports of the GPR to read value B, and read value A from the conflict queue. Because the processing element read value A from the conflict queue, rather than from the GPR, the second port of the two ports of the GPR is unused. Assuming that value C will be needed in the future, in some examples, the processing element may read value C from the second memory cell at the same time as reading value B from the first memory cell and store value C in the pre-fetch queue.

In this way, the techniques described in this disclosure may increase the utilization efficiency of the GPR, which further reduces instruction cycles. For instance, the storing of values for which a conflict would arise in a conflict queue may reduce idle time of executing NOP instructions, and the pre-fetching of next values may reduce the number of instructions that need to be executed because some values needed for later instructions are already stored in the pre-fetch queue, and execution of instructions to read such values may then not be needed.

FIG. 1 is a block diagram illustrating an example device for processing data in accordance with one or more example techniques described in this disclosure. FIG. 1 illustrates device 10, examples of which include, but are not limited to, video devices such as media players, set-top boxes, wireless handsets such as mobile telephones, personal digital assistants (PDAs), desktop computers, laptop computers, gaming consoles, video conferencing units, tablet computing devices, and the like.

In the example of FIG. 1, device 10 includes processor 12, graphics processing unit (GPU) 14, and system memory 16. In some examples, such as examples where device 10 is a mobile device, processor 12 and GPU 14 may be formed as an integrated circuit (IC). For example, the IC may be considered as a processing chip within a chip package, such as a system on chip (SoC). In some examples, processor 12 and GPU 14 may be housed in different integrated circuits (i.e., different chip packages) such as examples where device 10 is a desktop or laptop computer. However, it may be possible that processor 12 and GPU 14 are housed in different integrated circuits in examples where device 10 is a mobile device.

Examples of processor 12 and GPU 14 include, but are not limited to, one or more digital signal processors (DSPs), general purpose microprocessors, application specific integrated circuits (ASICs), field programmable logic arrays (FPGAs), or other equivalent integrated or discrete logic circuitry. Processor 12 may be the central processing unit (CPU) of device 10. In some examples, GPU 14 may be specialized hardware that includes integrated and/or discrete logic circuitry that provides GPU 14 with massive parallel processing capabilities suitable for graphics processing. In some instances, GPU 14 may also include general purpose processing capabilities, and may be referred to as a general purpose GPU (GPGPU) when implementing general purpose processing tasks (i.e., non-graphics related tasks).

For purposes of illustration, the techniques described in this disclosure are described with GPU 14. However, the techniques described in this disclosure are not so limited. The techniques described in this disclosure may be extended to other types of parallel processing units (e.g., processing units that provide massive parallel processing capabilities, even if not for graphics processing). Also, the techniques described in this disclosure may be extended to processing units not specifically configured for parallel processing.

Processor 12 may execute various types of applications. Examples of the applications include web browsers, e-mail applications, spreadsheets, video games, or other applications that generate viewable objects for display. System memory 16 may store instructions for execution of the one or more applications. The execution of an application on processor 12 causes processor 12 to produce graphics data for image content that is to be displayed. Processor 12 may transmit graphics data of the image content to GPU 14 for further processing.

As an example, the execution of an application on processor 12 causes processor 12 to produce vertices of primitives, where the interconnection of primitives at respective vertices forms a graphical object. In this example, the graphics data that processor 12 produces are the attribute data for the attributes of the vertices. For example, the application executing on processor 12 may generate color values, opacity values, coordinates, etc. for the vertices, which are all examples of attributes of the vertices. There may be additional attributes as well, and in some examples, the application need not produce all of the example attributes. In general, the techniques are extendable to data types (e.g., counters) other than attribute data, and the techniques should not be considered limited to attribute data or limited to examples of attribute data such as color values, opacity values, coordinates, etc.

In some non-graphics related examples, processor 12 may generate data that is better suited to be processed by GPU 14. Such data need not be for graphics or display purposes. For instance, processor 12 may output data on which matrix operations need to be performed by GPU 14, and GPU 14 may in turn perform the matrix operations.

In general, processor 12 may offload processing tasks to GPU 14, such as tasks that require massive parallel operations. As one example, graphics processing requires massive parallel operations, and processor 12 may offload such graphics processing tasks to GPU 14. However, other operations such as matrix operations may also benefit from the parallel processing capabilities of GPU 14. In these examples, processor 12 may leverage the parallel processing capabilities of GPU 14 to cause GPU 14 to perform non-graphics related operations.

Processor 12 may communicate with GPU 14 in accordance with a particular application processing interface (API). Examples of such APIs include the DirectX® API by Microsoft®, the OpenGL® or OpenGL ES® by the Khronos group, and the OpenCL™; however, aspects of this disclosure are not limited to the DirectX, the OpenGL, or the OpenCL APIs, and may be extended to other types of APIs. Moreover, the techniques described in this disclosure are not required to function in accordance with an API, and processor 12 and GPU 14 may utilize any technique for communication.

Device 10 may also include display 18, user interface 20, and transceiver module 22. Device 10 may include additional modules or units not shown in FIG. 1 for purposes of clarity. For example, device 10 may include a speaker and a microphone, neither of which are shown in FIG. 1, to effectuate telephonic communications in examples where device 10 is a mobile wireless telephone. Furthermore, the various modules and units shown in device 10 may not be necessary in every example of device 10. For example, user interface 20 and display 18 may be external to device 10 in examples where device 10 is a desktop computer. As another example, user interface 20 may be part of display 18 in examples where display 18 is a touch-sensitive or presence-sensitive display of a mobile device.

Display 18 may comprise a liquid crystal display (LCD), a cathode ray tube (CRT) display, a plasma display, a touch-sensitive display, a presence-sensitive display, or another type of display device. Examples of user interface 20 include, but are not limited to, a trackball, a mouse, a keyboard, and other types of input devices. User interface 20 may also be a touch screen and may be incorporated as a part of display 18. Transceiver module 22 may include circuitry to allow wireless or wired communication between device 10 and another device or a network. Transceiver module 22 may include modulators, demodulators, amplifiers and other such circuitry for wired or wireless communication.

System memory 16 may be the memory for device 10. System memory 16 may comprise one or more computer-readable storage media. Examples of system memory 16 include, but are not limited to, a random access memory (RAM), an electrically erasable programmable read-only memory (EEPROM), flash memory, or other medium that can be used to carry or store desired program code in the form of instructions and/or data structures and that can be accessed by a computer or a processor.

In some aspects, system memory 16 may include instructions that cause processor 12 and/or GPU 14 to perform the functions ascribed in this disclosure to processor 12 and GPU 14. Accordingly, system memory 16 may be a computer-readable storage medium having instructions stored thereon that, when executed, cause one or more processors (e.g., processor 12 and GPU 14) to perform various functions.

In some examples, system memory 16 may be a non-transitory storage medium. The term "non-transitory" may indicate that the storage medium is not embodied in a carrier wave or a propagated signal. However, the term "non-transitory" should not be interpreted to mean that system memory 16 is non-movable or that its contents are static. As one example, system memory 16 may be removed from device 10, and moved to another device. As another example, memory, substantially similar to system memory 16, may be inserted into device 10. In certain examples, a non-transitory storage medium may store data that can, over time, change (e.g., in RAM).

As described above, GPU 14 provides massive parallel processing capabilities. One way in which GPU 14 provides such parallel processing capabilities is via a single instruction, multiple data (SIMD) structure. In the SIMD structure, GPU 14 executes a plurality of instances of the same program. For instance, graphics processing, and some non-graphics related processing, require the same operations to be performed, but on different data.

For example, GPU 14 may execute shader programs (referred to simply as shaders) that perform graphics or non-graphics related tasks. GPU 14 includes at least one shader core, and the shader programs execute on the shader core. For brevity and ease of description, GPU 14 is described as performing graphics related tasks, but may similarly perform non-graphics related tasks. GPU 14 may execute multiple instances of the shader program to process multiple graphics items at one time.

A graphics item is a base unit on which GPU 14 performs parallel processing. GPU 14 may process a plurality of graphics items in parallel (e.g., at the same time). For example, a vertex shader may process a vertex, and GPU 14 may execute a plurality of instances of the vertex shader in parallel to process a plurality of vertices at the same time. Similarly, a pixel or fragment shader may process a pixel of a display, and GPU 14 may execute a plurality of instances of the pixel shader in parallel to process a plurality of pixels of the display at the same time. A vertex and a pixel are examples of a graphics item.

For non-graphics related applications, the term graphics item also refers to smallest unit on which GPU 14 performs processing. However, such processing may not be graphics related. According, the term "graphics item" is meant to refer to items that a graphics processing unit (e.g., GPU 14) or a general purpose graphics processing unit (e.g., examples where GPU 14 is functioning as a GPGPU) is to process in parallel. The graphics item may be used for graphical or non-graphical purposes.

In some cases, the term "fiber" is referred to as a base unit on which GPU 14 performs processing. The term "fiber" is synonymous with "graphics item." The massive parallel processing capabilities of GPU 14 allows GPU 14 to process a plurality of fibers at the same time. A plurality of fibers that GPU 14 processes at the same time is referred to as a wave. In this disclosure, a "graphics wave" is synonymous with a wave of fibers. In other words, a plurality of graphics items forms a graphics wave.

As described above, for parallel processing, GPU 14 may execute multiple instances of a shader program to process graphics items at one time. For instance, GPU 14 may execute multiple instances of a vertex shader to process multiple vertices at one time (e.g., in parallel). In general, the operations that need to be performed for a vertex are the same as the operations that need to be performed for other vertices.

Although the operations that need to be performed for the vertex is the same, one or more attribute data of each of the vertices may be different. For example, each graphics item (e.g., a vertex or a pixel) is associated with a plurality of attributes. Each attribute includes attribute data. As an example, a vertex of a primitive or a pixel of a display may be defined by coordinates (e.g., x, y, z, w). Each of the vertices and pixels may also be defined by colors (e.g., a red-component, a green-component, blue-component (RGB)). There may also be an opacity value for each vertex or pixel (e.g., an alpha value). The coordinates, color, and opacity are all examples of attributes of a graphics item (e.g., fiber) and there may be more or fewer attributes than the examples.

The attributes should not be considered limited to coordinates, color, and opacity. Coordinates, color, and opacity are provided merely to assist with understanding. However, for some cases, the attributes of a graphical item may be limited to specific data types (e.g., due to the manner in which a shader program is programmed or due to the manner in which GPU 14 is designed).

In general, each graphics item may be associated with a plurality of variables, and the plurality of variables is needed for processing each of the graphics items. One example of the plurality of variables is the attributes associated with a vertex or pixel. For each variable, there may be data (e.g., values) that define the variable. One example of the data is the attribute data associated with each attribute. In this example, the attributes associated with the vertices or pixels are needed for processing each of the vertices and pixels. To process the attributes, GPU 14 processes the attribute data of the attributes.

For ease of description, the techniques are described with reference to attribute data associated with attributes needed for processing a vertex or a pixel. However, the techniques described in this disclosure are applicable generally to data associated with variables needed to process a graphics item, and the attribute data associated with attributes for a vertex or a pixel is provided for ease of understanding.

In the techniques described in this disclosure, the attribute data may be considered as operand values (also referred to simply as operands) because these are the values on which the instructions operate. GPU 14 may include a general purpose register (GPR) that is configured to store the operand values. In some cases, the result of the operation defined by the instruction may be the input to another subsequent instruction, and therefore, in some cases the GPR may be configured to store the resulting value from the operation.

To promote parallel processing, the GPR may be configured as a multi-port GPR. In a multi-port GPR, multiple values can be read from the GPR or written to the GPR at the same time. For instance, assume that the GPR has two write ports and four read ports (2W4R). In this example, up to four values can be read from the GPR simultaneously (in parallel), one value from one port.

For example, GPU 14 includes a shader core on which the shader program executes. For instance, the shader core includes a plurality of processing elements that perform the operations defined by the instructions of shader program. Each processing element may execute instructions of one instance of the shader program. One instruction of one instance of the shader program is referred to as a thread.

There may be multiple different ways to design a GPR, and in some examples, the GPR is designed for the specific configuration of GPU 14. For example, the processing elements of GPU 14 may be considered as arithmetic logic units (ALUs) that are each designed to handle up to three operand values. An operand value (or simply operand) is a value on which an operation defined by an instruction is performed. As a basic example, the instruction may define adding X, Y, and Z. In this example, X, Y, and Z are operand values on which the add operation is performed, and the processing elements may be configured to perform arithmetic operations on three or fewer operand values.

In addition to the processing elements, GPU 14 may also include an elementary function unit (EFU), texture sample unit, and a memory load/store unit that each read values from the GPR. The GPR may also store the final output value (e.g., final pixel value) that is to be outputted for display. The GPR may also receive values from the processing elements (e.g., the results of the arithmetic operation), values from the EFU, the texture sample unit, the memory load/store unit, as well as other input values.

For one example of GPU 14 that includes the example units described above, the GPR including four read ports and two write ports may be sufficient to facilitate the parallel processing capabilities of GPU 14. In some examples of GPU 14, the GPR may include a different number of read and write ports than the example described above to facilitate parallel processing capabilities of that specific example of GPU 14.

In some cases, the designers of GPU 14 may design a specific type of GPR for GPU 14. For instance, if GPU 14 is to use a four read ports, two write ports GPR, then the designers of GPU 14 may design a single memory cell GPR that includes four read ports and two write ports. In this example, up to four values from the single memory cell of the GPR can be read simultaneously without any port conflicts, and up to two values can be written to the single memory cell of the GPR simultaneously without any port conflicts.

While designing single memory cell, multi-port GPRs may be advantageous for promoting parallel processing (e.g., multiple values can be read or written in parallel), there may be certain drawbacks. For instance, area and power that such GPRs require may be relatively high. Also, the single memory cell of the GPR cannot form as a basic building block from which other GPRs can be created because the single memory cell of the GPR was designed for a specific configuration of GPU 14. In other words, the single memory cell, multi-port GPRs may not be friendly with design migration.

The techniques described in this disclosure utilize a GPR that is formed from a plurality of separate, distinct memory cells, with each memory cell having limited number of read and write ports. For instance, one of the plurality of memory cells may include only one read port and only one write port; however, it may be possible to include more read and write ports (but no so many that the memory cells impact design migration). For purposes of illustration, this disclosure is described with examples where each memory cell (also referred to as a memory bank) of the plurality of memory cells includes only one read port and only one write port. Because the plurality of memory cells are separate and distinct, values stored in a memory cell may only be readable from the read port of that memory cell, and values may only be written to in the memory cell using only the write port of that memory cell.

To facilitate data transfer to and from the memory cells, the GPR, as described in this disclosure, may include input and output crossbars. The input and output crossbars may be considered as a matrix of switches to interconnect the units that are reading from or writing to the GPR, and the particular memory cell that stores the values being read or that will store the values being written.

In this manner, using a plurality of standard one write, one read memory cells and input and output crossbars, it may be possible to design various types of GPRs that migrate well between designs with higher per bit density and lower per bit power consumption. For example, to emulate the 2W4R single memory cell GPR described above, it may be possible to use four 1W1R memory cells that each store one-fourth of the amount of data as the 2W4R single memory cell GPR, and include a 4×4 output crossbar to allow four values to be read, and a 2×4 input crossbar to allow two values to be written.

Figure 2A:
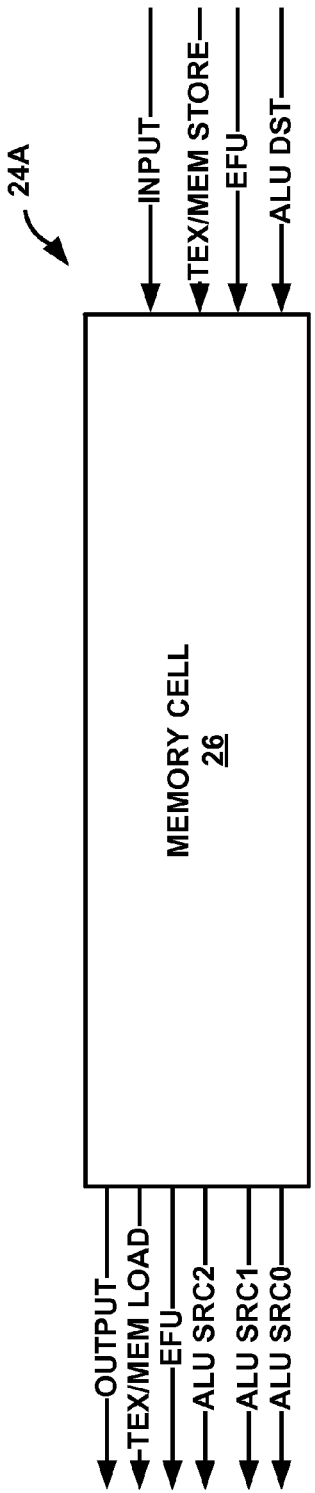
FIG. 2A is a block diagram illustrating an example of a general purpose register (GPR) with a single, multi-port memory cell.
Figure 2B:
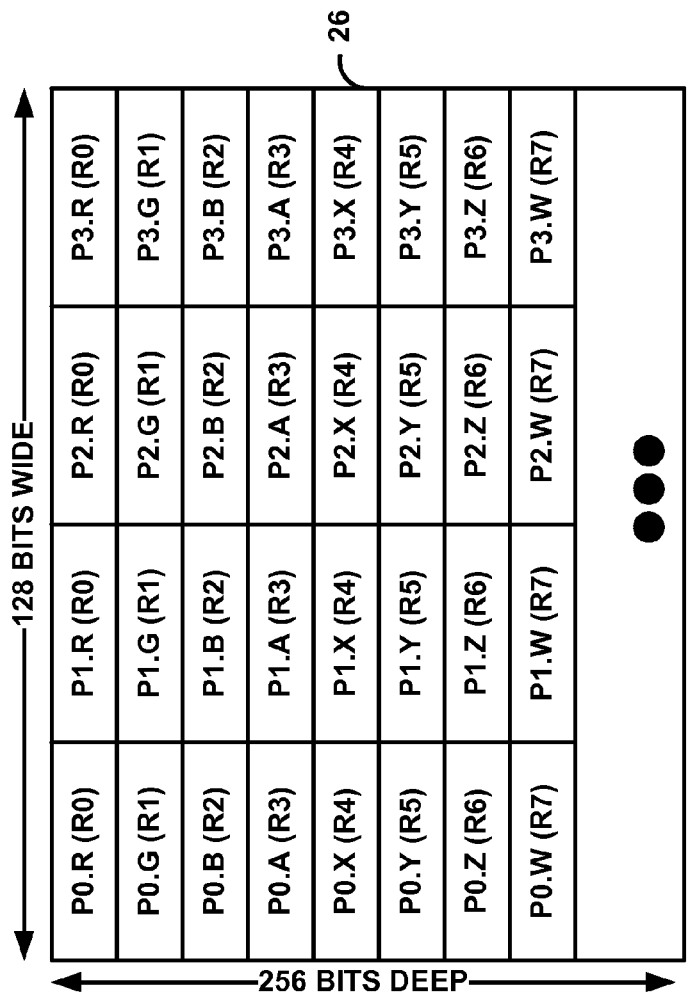
FIG. 2B is a conceptual diagram illustrating operand values stored in the single, multi-port memory cell of the GPR of FIG. 2A.

FIG. 2A is a block diagram illustrating an example of a general purpose register (GPR) with a single, multi-port memory cell. FIG. 2B is a conceptual diagram illustrating operand values stored in the single, multi-port memory cell of the GPR of FIG. 2A. As illustrated in FIG. 2A, GPR 24A includes memory cell 26 (also referred to as a macro) that receives various inputs such as an input from texture/memory store unit, the result of an elementary function unit (EFU), and the result of an arithmetic operation from a processing unit (illustrated as ALU DST). Memory cell 26 of GPR 24A outputs various data such as values to texture/memory store unit, to the EFU, and up to three operand values to an ALU (illustrated as ALU SRC0-SRC2).

GPR 24A may be a 2W4R GPR. In this example, memory cell 26 may be designed such that up to two values can be written simultaneously (e.g., in parallel) to memory cell 26 and up to four values can be read simultaneously (e.g., in parallel) from memory cell 26.

FIG. 2B illustrates an example of values stored in memory cell 26. In this example, memory cell 26 is 128 bits wide by 256 bits deep. In FIG. 2B, P0-P3 refer to pixels or vertices (e.g., graphic items or fibers), R, G, B, and A refer to the red component, green component, blue component, and opacity component, respectively, and X, Y, Z, and W refer to the 3-D coordinates. For instance, P0.R refers to the red component of pixel P0, P0.G refers to the green component of pixel P0, and so forth, and the same applies to pixels P1, P2, and P3.

The variables R0-R7 are utilized as a simple way to group common attributes together. For instance, GPU 14 may be configured to process four pixels in parallel (e.g., quad processing). The variable R0 may refer to the red component of the four pixels P0-P3. In other words, if an instruction indicates that variable R0 is an operand, the instruction defines that P0.R-P3.R are operands that will be processed in parallel.

Figure 3A:
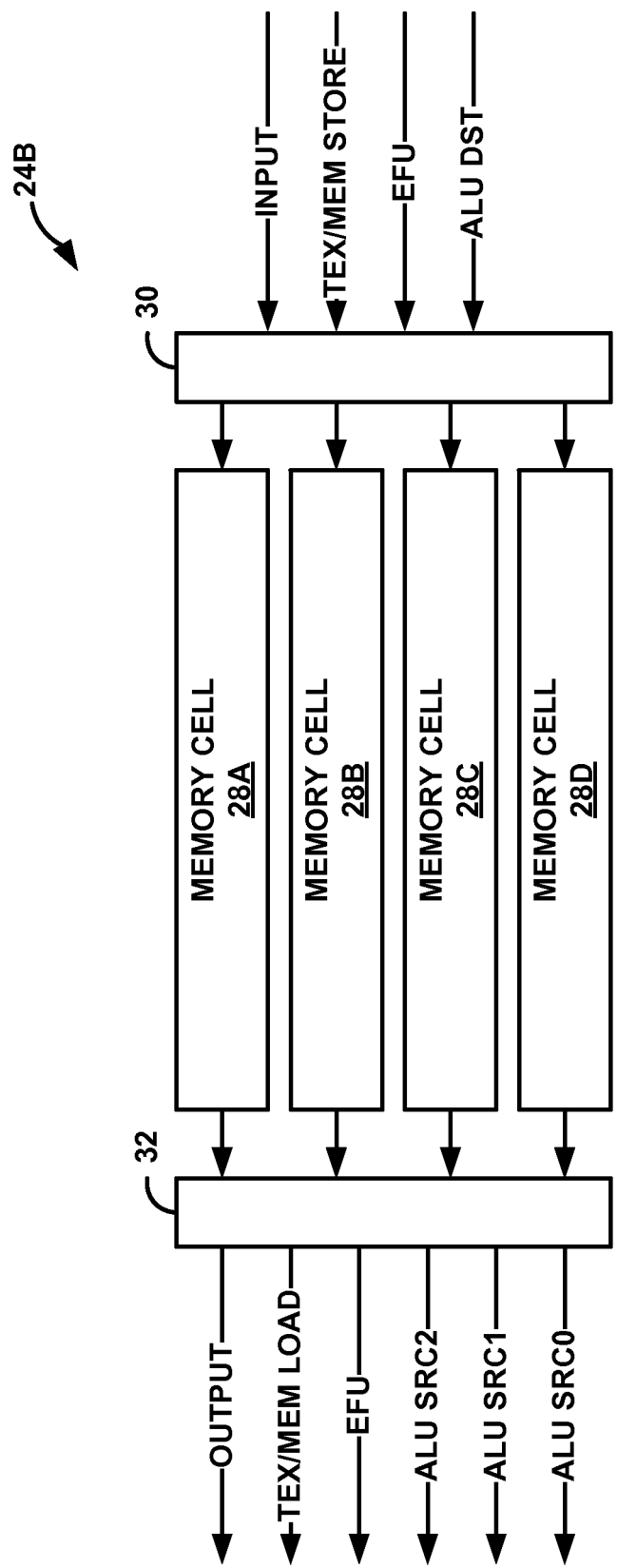
FIG. 3A is a block diagram illustrating an example of a general purpose register (GPR) with a plurality of single write, single read memory cells.
Figure 3B:
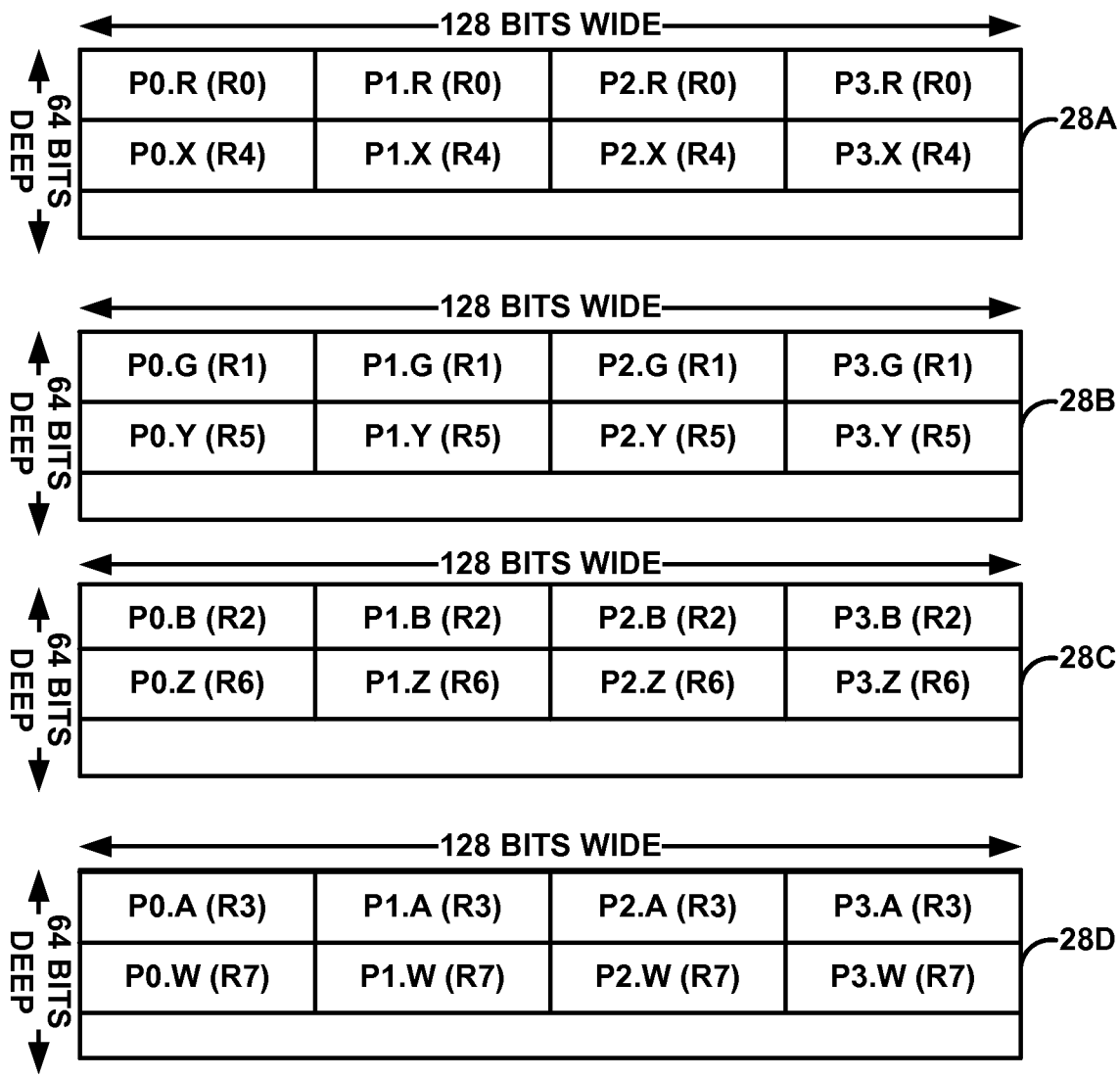
FIG. 3B is a conceptual diagram illustrating operand values stored in the plurality of single write, single read memory cells of the GPR of FIG. 3A.

FIG. 3A is a block diagram illustrating an example of a general purpose register (GPR) with a plurality of single write, single read memory cells. FIG. 3B is a conceptual diagram illustrating operand values stored in the plurality of single write, single read memory cells of the GPR of FIG. 3A. As illustrated in FIG. 3A, GPR 24B includes similar inputs and outputs as the example of GPR 24A in FIG. 2A. However, rather than including a single memory cell 26, GPR 24B includes a plurality of separate, distinct memory cells 28A-28D. Also, whereas memory cell 26 is a multi-port memory cell with multiple read and multiple write ports, memory cells 28A-28D may be single port memory cells with only one read and only one write port. Each one of memory cells 28A-28D may store one-fourth the amount of data that memory cell 26 stores. For instance, as illustrated in FIG. 3B, each one of memory cells 28A-28D is 128 bits wide by 64 bits deep, and therefore, four memory cells 28A-28D together provide as much storage as 128 bits wide by 256 bits deep memory cell 26.

GPR 24B also includes 2×4 input crossbar 30 and 4×4 output crossbar 32. Input crossbar 30 may be configured to interconnect two of the units that provide input to two of memory cells 28A-28D simultaneously. For instance, input crossbar 30 may connect memory cell 28A to the output from the EFU and connect memory cell 28B to the output of the texture/memory store unit so that the EFU and texture/memory store unit can write to GPR 24B at the same time. Output crossbar 32 may be configured to interconnect four of the units that read values to four of memory cells 28A-28D simultaneously. For instance, output crossbar 32 may connect memory cell 28A to the input of the EFU, connect memory cell 28B to the input of ALU SRC2, connect memory cell 28C to the input of ALU SRC1, and connect memory cell 28D to the input of ALU SRC0. In this example, the processing unit is able to read three operand values (e.g., via ALU SRC0-SRC2) from respective memory cells 28B-28D, and the EFU is able to read its operand value from memory cell 28A all in parallel with one another.

In this way, GPR 24B may be formulated to function as a 2W4R GPR, similar to GPR 24A, using standard 1W1R memory cells 28A-28D. However, there may be issues with GPR 24B, such as port conflicts that otherwise may not exist in GPR 24A.

For instance, as illustrated in FIG. 3B, each one of memory cells 28A-28D stores a portion of the data that memory cell 26 of FIG. 2B stored. In the example illustrated in FIGS. 3A and 3B, it may not be possible to read multiple values stored in the same one of memory cells 28A-28D in parallel, or write multiple values to be stored in the same one of memory cells 28A-28D in parallel. Instead, such reading or writing may need to be serialized so that the values are read or written one after the other, rather than in parallel (e.g., at the same time).

As an example, assume that the instruction that a processing element is to execute is R0+R4. As described above, GPU 14 may process pixels in quad (process four pixels at a time). Accordingly, R0 refers to the attributes of pixels P0-P3 and R4 refers to attributes of pixels P0-P3. Also, as described above, R0 refers to the red components of pixels P0-P3 and R4 refers to the x-coordinate of pixels P0-P3. In general, there would be very few instances where GPU 14 would need to add the red component to the x-coordinates. Therefore, this example of R0+R4 is merely provided to assist with understanding, and for purposes of the example, R0 and R4 can be considered as a representing attributes of different pixels and not necessarily the attributes illustrated in FIGS. 2A, 2B, 3A, and 3B.

In the example illustrated in FIGS. 2A and 2B, the processing element may be able to read values R0 and R4 at the same time. For example, GPR 24A provides four read ports, and the processing element may utilize two of the four read ports. For instance, in the instruction R0+R4, R0 and R4 are operands. The processing element may be considered as reading R0 via ALU SRC0 and as reading R1 via ALU SRC1. In this way, only one clock cycle is needed to read values R0 and R4.

In the example illustrated in FIGS. 3A and 3B, the processing element may not be able to read values R0 and R4 at the same time. For instance, as illustrated in FIG. 3B, memory cell 28A stores both R0 and R4. As described above, memory cell includes only one read port. Accordingly, output crossbar 32 would provide one connection to memory cell 28A, via ALU SRC0, from which the processing element would read one of values R0 or R4, and then after reading one of values R0 and R4, output crossbar 32 would provide one connection to memory cell 28A, via ALU SRC1, from which the processing element would read the other of values R0 and R4. In this example, two clock cycles are needed to read values R0 and R4 since they cannot be read at the same time due to memory cell 28A having only one read port.

In this disclosure, a situation where more values than supported by a read port or write port need to be read or written in one clock cycle (e.g., at the same time or simultaneously) is referred to as an operand conflict. For instance, in the example illustrated in FIG. 3B, memory cells 28A-28D provide only one read port, and when two values need to be read simultaneously (e.g., in the same clock cycle), there is an operand conflict. The techniques described in this disclosure describe a way to resolve the operand conflict prior to execution of the instruction so that the conflict operands (e.g., the operand values that need to be read or written at the same time to the same memory cell) do not have be read or written at the same time.

Figure 4:
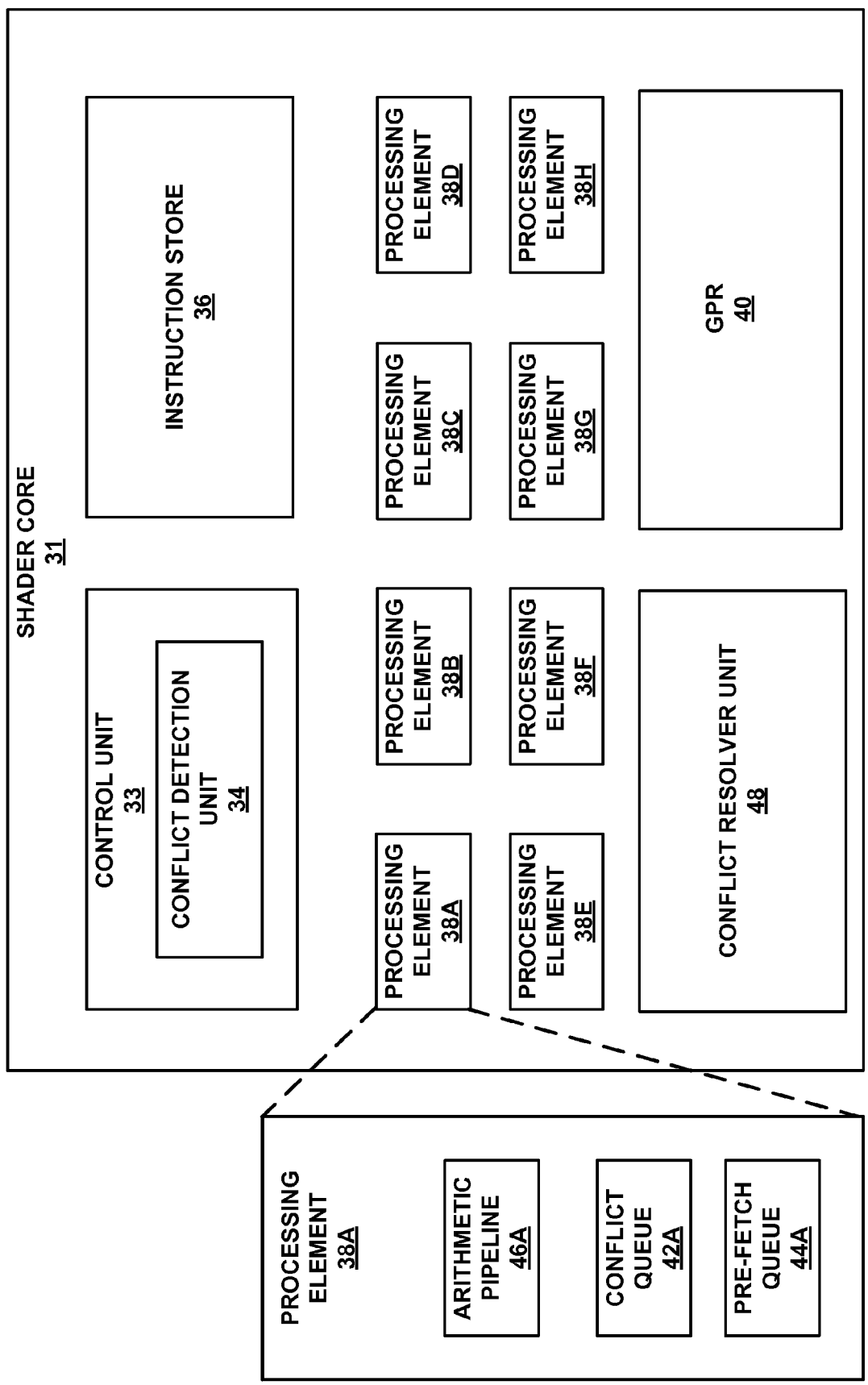
FIG. 4 is a block diagram illustrating one example of a shader core of a graphics processing unit (GPU).

FIG. 4 is a block diagram illustrating one example of a shader core of a graphics processing unit (GPU). For instance, FIG. 4 illustrates one example of shader core 31 of GPU 14. Shader core 31 may include control unit 33, which includes conflict detection unit 34, instruction store 36, one or more processing elements 38A-38H (collectively referred to as "processing elements 38"), GPR 40, and conflict resolver unit 48. Although FIG. 4 illustrates eight processing elements 38, there may be more or fewer than eight processing elements 38 in other examples. Processing elements 38 are examples of processing elements on which instances of the shader program execute in parallel.

Control unit 33 may control the functionality of shader core 31. For example, control unit 33 may retrieve the instructions that are to be executed by processing elements 38 and store the instructions in instructions store 36. Also, control unit 33 may retrieve the attribute data (e.g., operand values) that processing elements 38 are to process and store the attribute data in GPR 40.

GPR 40 may be similar to GPR 24B, as illustrated in FIG. 3A. For instance, GPR 40 may include a plurality of separate, distinct memory cells, each with limited number of read and write ports (e.g., only one read and only write port), and where values stored in one of the memory cells can only be read from and written to from its read and write ports, respectively. In the example illustrated in FIG. 4, there may be conflicts in reading and writing values from GPR 40.

Instruction store 36 may be memory capable of storing instructions such as, but not limited to volatile memory, non-volatile memory, a cache, random access memory (RAM), static RAM (SRAM), dynamic RAM (DRAM), etc. Control unit 33 may be hardwired circuitry of shader core 31 that controls the components of shader core 31. However, it may be possible for control unit 33 to be formed at least in part by software or firmware, executing on hardware, of shader core 31.

Processing elements 38 are configured to execute threads of a shader program. Each of processing elements 38 may execute a different thread. For example, each of processing elements 38 may execute an instance of an instruction of a shader program with respect to potentially different graphics items (e.g., different fibers). Processing elements 38 may be single-instruction, multiple-data (SIMD) processing elements. SIMD processing elements refer to processing elements that, when activated, are configured to execute the same instruction at the same time with respect to different data. This may allow processing elements 38 to execute a plurality of threads of a shader program in parallel with respect to different data items. In some cases, each of processing elements 38 may execute instructions of a shader program based on a common program counter that points to an instruction contained in instruction store 36.

If one or more of processing elements 38 are deactivated by control unit 33, then such processing elements 38 do not execute a program instruction for a given instruction cycle. In some cases, control unit 33 may deactivate one or more of processing elements 38 to implement conditional branch instructions where the branching condition is satisfied for some threads and not satisfied for other threads.

In some examples, each of processing elements 38 may include and/or correspond to one or more arithmetic logic units (ALUs). In further examples, each of processing elements 38 may implement ALU functionality. ALU functionality may include addition, subtraction, multiplication, etc.

For instance, FIG. 4 illustrates processing element 38A in further detail. Processing elements 38B-38H may be similar to processing element 38A. As illustrated, processing element 38A includes conflict queue 42A, pre-fetch queue 44A, and arithmetic pipeline 46A. Conflict queue 42A and pre-fetch queue 44A are described in more detail below, and arithmetic pipeline 46A may be configured to perform mathematical functions such as addition, subtraction, multiplication, division of different operand values stored in GPR 40.

For ease of description, the following examples are described with respect to processing element 38A, but the examples are equally applicable to other processing elements 38 as well. In some cases, an instruction that processing element 38A executes cause processing element 38A to read multiple operand values from GPR 40. As described above, processing elements 38 may be configured to process three operands (e.g., perform arithmetic operations that require up to three values) in parallel. To perform the arithmetic operation, defined in the instruction, processing element 38A may read the operand values in one clock cycle from GPR 40. However, if the operand values are stored in the same memory cell in GPR 40, a conflict may arise.

In the techniques described in this disclosure, prior to processing elements 38 executing an instruction that would cause a conflict (e.g., cause a processing element to read more values from a memory cell in GPR 40 than the number of read ports of the memory cell in GPR 40 will support), conflict detection unit 34 may determine whether the execution of the instruction stored in instruction store 36 will cause a conflict. For instance, conflict detection unit 34 may determine whether execution of an instruction would cause simultaneous reading of more values from a first memory cell of a plurality of memory cells of GPR 40 than a read port of the first memory cell can output. As described above, determining whether execution of an instruction would cause simultaneous reading of more values from a first memory cell of a plurality of memory cells of GPR 40 than a read port of the first memory cell can output may mean that execution of the instruction (in conjunction with other instructions, sub-instructions of the instruction, or by itself) would result in more values being read from the first memory cell than a read port of the first memory cell can output (e.g., output in the same clock cycle).

There may be many various ways in which conflict detection unit 34 may determine whether the execution of the instruction stored in instruction store 36 will cause a conflict, and the following is merely one example way. Other ways to determine whether execution will cause a conflict may be possible.

In some examples, the instructions stored in instruction store 36 may indicate where the operand values are to be read from in GPR 40. For instance, control unit 33 may control the storage of values into GPR 40, and may include information in the instructions stored in instruction store 36 identifying from where the operand values are to be read. Conflict detection unit 34 may determine where the operand values are to be read from GPR 40. If conflict detection unit 34 determines that the operand values are to be read from the same memory cell of the plurality of memory cells of GPR 40, conflict detection unit 34 may determine that a conflict exists.

For example, as described above, processing element 38A may read up to three operand values using ALU SRC0-ALU SRC2. In one example, conflict detection unit 34 may compare where the value via ALU SRC0 and where the value via ALU SRC1 are to be read. If the location from where the values are to be read is not incremental, conflict detection unit 34 may determine that there is a conflict. For example, for parallel processing, GPU 14 may be configured to execute instructions in which the operands of an instruction are retrieved from different memory cells, and these instructions are repeated with an incremental change in the memory cells from which the operands are retrieved. If there is no incremental change, then conflict detection unit 34 may determine that a variable is being read twice from the same memory cell at the same time, and determine that there is a conflict. Similarly, conflict detection unit 34 may compare where the value via ALU SRC0 and where the value via ALU SRC2 are to be read, and where the value via ALU SRC1 and where the value via ALU SRC2 are to be read. If the locations are not incremental, as described above, conflict detection unit 34 may determine that a conflict exists.

For instance, assume that processing element 38A is to execute an instruction that requires arithmetic operation on three operands. One example of such an instruction is the multiply and add operation (MAD) operation in which two operand values are multiplied and the resulting value is added to the third operand value. In this example, one instruction includes the reading of three operands. In some examples, it may be possible that three instructions include the reading of three respective operands, and if the three operands are stored in the same memory cell a conflict would result. In this example, the execution of one of the instructions (in conjunction with at least one other) would cause simultaneous reading of more values from a memory cell than a read port of the memory cell can output.

In some cases, conflict detection unit 34 may determine that no conflict exists such as where each of the operand values is stored in different memory cells of the plurality of memory cells in GPR 40. In some cases, conflict detection unit 34 may determine that one conflict exists where two of the three operand values need to be read from the same memory cell (e.g., either between ALU SRC0 and ALU SRC1, between ALU SRC0 and ALU SCR2, or between ALU SRC1 and ALU SRC2). In some cases (e.g., worst case scenario), conflict detection unit 34 may determine that two conflicts exists because all three operand values are stored in the same memory cell.

In the event that conflict detection unit 34 determines that a conflict exists, conflict detection unit 34 may include a source conflict (SC) bit in the instruction to indicate that execution of this instruction causes a conflict. In addition, control unit 33 indicates to conflict resolver unit 48 that execution of the instruction causes a conflict, and conflict resolver unit 48 may resolve the conflict prior to the execution instruction.

Resolving the conflict prior to execution means that conflict resolver unit 48 may read or cause processing element 38A to read one of the conflict operands prior to execution of the instruction and cause the storage of one of the conflict operands in conflict queue 42A of processing element 38A. For instance, GPR 40 may provide for four read ports with an output crossbar similar to output crossbar 32 of FIG. 3A. Assume that the conflict operands are stored in a first memory cell of GPR 40. In this example, conflict resolver unit 48 may determine whether there is storage space in conflict queue 42A. If there is storage space in conflict queue 42A and the SC bit is set for an instruction, conflict resolver unit 48 may determine whether all four read ports of GPR 40 is being used and if any of the read ports are reading from the memory cell that stores the conflict operands (e.g., first memory cell).

If all four read ports of GPR 40 are not being used and no value is being read from the memory cell that stores the conflict operands (e.g., first memory cell), conflict resolver unit 48 may cause processing element 38A to read one of the conflict operands and store the conflict operand in conflict queue 42A or conflict resolver unit 48 may directly read one of the conflict operands and store the conflict operand in conflict queue 42A. In addition, conflict resolver unit 48 or control unit 33 may modify the instruction that processing element 38A is to execute to indicate that processing element 38A is to read one operand value from GPR 40 and the other one or more operand values from conflict queue 42A.

In other words, prior to execution of the instruction, conflict resolver unit 48 or processing element 38A may store one or more values stored in the first memory cell in conflict queue 42A based on the determination that execution of the instruction would cause simultaneous reading of more values from the first memory cell than the read port of the first memory cell can output. For instance, conflict resolver unit 48 may determine an instance when all of the reading ports of GPR 40 are not in use and when one or more values are not being read from the first memory cell. Conflict resolver unit 48 or processing element 38A may store the one or more values stored in the first memory cell in conflict queue 42A during the determined instance.

As an illustrative example, assume that GPR 40 includes a four memory cells similar to FIG. 3B, and that the first memory cell stores R0 and R4. Also, assume that processing element 38A is to execute an instruction R0+R4. In this example, conflict detection unit 34 may first determine that reading values R0 and R4 would cause a conflict because both values are needed to be read from the same memory cell, and the number of read ports of the memory cell is less than the number of read ports needed to read the values at the same time. Conflict detection unit 34 may include the SC bit indicating that execution of the instruction would cause a conflict that should be resolved.

In turn, conflict resolver unit 48 may determine whether sufficient storage space is available in conflict queue 42A to store a conflict operand value (e.g., one of values R0 and R4). A conflict operand value may be one of the values stored in the memory cell that needs to be read at the same time as other values from the memory cell. Conflict resolver unit 48 may also determine whether access to GPR 40 is available because not all read ports of GPR 40 are being used and determine whether access to the memory unit that stores R0 and R4 is available. If conflict resolver unit 48 determines not all read ports GPR 40 are being used and that access to the memory unit that stores R0 and R4 is available, conflict resolver unit 48 may cause processing element 38A to read one of values R0 or R4 (assume R0) and store value R0 is conflict queue 42A, or conflict resolver unit 48 may read one of values R0 or R4 (again, assume R0) and store value R0 is conflict queue 42A.

Conflict resolver unit 48 or control unit 33 may modify the instruction that instructed processing element 38A to read values R0 and R4 from GPR 40. For instance, control resolver unit 48 or control unit 33 may modify the instruction that instructed processing element 38A to read values R0 and R4 from GPR 40 so that the instruction instructs processing element 38A to read value R4 from GPR 40 and read value R0 from conflict queue 42A.

Processing element 38A may then execute the instruction. In this case, processing element 38A may read value R4 from GPR 40 and read value R0 from conflict queue 42A. For example, processing element 38A may read value R4 from GPR 40, and arithmetic pipeline 46A may receive value R4 from GPR 40. However, arithmetic pipeline 46A may receive value R0 from conflict queue 42A, rather than GPR 40. In this manner, arithmetic pipeline 46A may be able to receive both operand values in the same clock cycle. In other words, the techniques described in this disclosure may determine that a conflict exists in an instruction, in which execution of the instruction would cause processing element 38A to retrieve more operand values from a memory cell than the number of read ports of the memory cell supports. In response, the techniques may store an operand value from GPR 40 into processing element 38A. Processing element 38A may then execute the instruction, and read one of the operand values from GPR 40 and the other operand(s) from conflict queue 42A.

In this way, the techniques described in this disclosure may determine, prior to execution of an instruction, whether execution of the instruction will a conflict, where the conflict occurs if execution of the instruction causes reading of more values, at the same time, from a memory cell of a plurality of distinct and separate memory cells of GPR 40 than read ports of the memory cell support. If determined that execution will cause a conflict, the techniques may per-load values needed for executing the instruction in conflict queue 42A, prior to execution of the instruction. The techniques may also modify the instruction to indicate that only one of the values is to be read from the memory cell of GPR 40 and the other values are to be read from conflict queue 42A. During execution, processing element 38A may read one of the values from the memory cell of GPR 40 and the other values from conflict queue 42A. Because the values are not all in the same memory cell of GPR 40, no conflict exists, and processing element 38A may be able to read all of the values in one clock cycle (e.g., at the same time).

As illustrated, in some examples, processing element 38A may also include a pre-fetch queue 44A. Pre-fetch queue 44 may be used to store values that will be needed for subsequent instructions. For instance, with the conflict resolution, processing element 38A may need to use only one read port of GPR 40, meaning that additional read ports of GPR 40 may be available. As an example, in the previous case, the instruction originally instructed processing element 38A to read values R0 and R4 from GPR 40, which means that, prior to conflict detection unit 34 determining that a conflict exists, control unit 33 determined that two of the four read ports of GPR 40 will be utilized, and may have granted read access to two other units so that all four read ports of GPR 40 will be utilized.

Then, after conflict resolution, value R0 was stored in conflict queue 42A, and processing element 38A only needed to use one of the read ports of GPR 40, rather than the two read ports control unit 33 assigned to processing element 38A. In this example, this means that one of the ports to GPR 40 is still available. In some examples, conflict resolver unit 48 or control unit 33 may cause processing element 38A to use the remaining read port to read a value for a subsequent instruction, and store the value in pre-fetch queue 44A.

Pre-loading of values and pre-fetching of values should not be confused. The pre-loading of values occurs prior to execution of an instruction that would have caused reading more values from a memory cell than read ports of the memory cell support to mitigate against conflicts. The pre-fetching of values occurs during the execution of the instruction for reading values from a memory cell other than the memory cell on whose values the arithmetic operation is to be performed, where the values are needed for the execution of subsequent instructions.

The following is an example that further illustrates the storage of values in conflict queue 42A and pre-fetch queue 44A. In this example, processing element 38A to execute the following instruction: (rpt3) Mad.f32 R0, R0, R4, R8. The "rpt3" means that this instruction represents four "Mad" operations (e.g., implement the instruction once, and then repeat three times). A Mad operation is a "multiply-and-add" operation, where two operands are multiplied together and the result is added to a third operand. For instance, the (rpt3) Mad.f32 R0, R0, R4, R8 instruction can be split into the following sub-instructions:

$R0=R0*R4+R8;$ $R1=R1*R5+R9;$ $R2=R2*R6+R10;$ and $R3=R3*R7+R11.$

For purposes of illustration, assume that GPR 40 includes four memory cells that each store values similar to the example illustrated in FIG. 3B. For instance, as illustrated in FIG. 3B, memory cell 28A stores values R0 and R4, and based on that pattern would store value R8. Similarly, memory cell 28B stores values R1 and R5, and based on that pattern would store value R9, memory cell 28C stores values R2 and R6, and based on that pattern would store value R10, and memory cell 28D stores values R3 and R7, and based on that pattern would store value R11.

Similar to FIG. 3B, in this example, assume that a first memory cell of GPR 40 stores values R0, R4, and R8, a second memory cell of GPR 40 stores values R1, R5, and R9, a third memory cell of GPR 40 stores values R2, R6, and R10, and a fourth memory cell of GPR 40 stores values R3, R7, and R11. This example illustrates a "worst case" scenario in which all operands for the respective sub-instructions are stored in the same memory cell. Therefore, there is a conflict for each operand.

As an example, for the instruction R0*R4+R8, R0, R4, and R8 are all stored in the first memory cell of GPR 40, which means it is not possible to read all three values at the same time because the first memory cell may only have a single read port, and therefore three values cannot be read simultaneously (e.g., in parallel). The same is true for the other three instructions.

In the techniques described in this disclosure, conflict detection unit 34 may determine that the (rpt) Mad.f32 R0, R0, R4, R8 instruction would result in a conflict, and in response, would assert a "source conflict" (SC) bit associated with the instruction. Conflict resolver unit 48 may determine that execution of the instruction would result in a conflict based on the SC bit. In response, conflict resolver unit 48 may determine an instance when all read ports of GPR 40 are not being used and when the first memory cell is not being read. Conflict resolver unit 48 may then cause processing element 38A to store one of R0, R4, or R8 (assume R4) in conflict queue 42A or directly store one of R0, R4, or R8 (assume R4) in conflict queue 42A at the determined instance. Because there are three conflict operands in this example, conflict resolver unit 48 may also determine another instance when all read ports of GPR 40 are not being used and when the first memory cell is not being read. Conflict resolver unit 48 may then cause processing element 38A to store one of R0 or R8 (assume R8), because R4 was also stored in conflict queue 42A, in conflict queue 42A or directly store one of R0 or R8 (assume R8) in conflict queue 42A at the determined instance.

In this example, conflict resolver unit 48 may cause processing element 38A to store values R4 and R8 (or may directly store values R4 and R8) in conflict queue 42A prior to the execution of the instruction by processing element 38A. In some examples, conflict resolver unit 48 may modify the instruction that processing element 38A is to execute so that processing element 38A reads the R4 and R8 values from conflict queue 42A instead of from GPR 40. In other words, processing element 38A, during execution, may read at least one value from the first memory cell of GPR 40 (e.g., R0) and at least one value from conflict queue 42A (e.g., R4 and R8).

Also, the original instruction of R0=R0*R4+R8 meant that processing element 38A was going to use three read ports of GPR 40 during execution of the instruction. However, because values R4 and R8 are stored in conflict queue 42A, during execution of the modified instruction, processing element 38A may only need one of the read ports to read the R0 value. This means that two read ports of GPR 40 are available.

In some examples, during execution of the modified instruction where one or more read ports are available, conflict resolver unit 48 may cause processing element 38A to pre-fetch values for the next instruction(s) to be executed or may directly pre-fetch values for the next instruction(s) to be executed. In this example, the values that are pre-fetched are in a different memory cell than the memory cell that includes the values being read that is needed for the execution of the current instruction.

For instance, as described above, the next instruction that processing element 38A is going to execute is R1=R1*R5+R9. Also, in the above example, during execute, processing element 38A will read R0 from the first memory cell, read values R4 and R8 from conflict queue 42A, meaning that two read ports of GPR 40 are available. In this example, processing element 38A or conflict resolver unit 48 may use one of the two read ports to read one of values R1, R5, or R9 (assume R5), which are all stored in the second memory cell of GPR 40, and store the value in pre-fetch queue 44A.

In some instances, processing element 38A or conflict resolver unit 48 would have read one of R1 or R9 (R5 being read with one of the two available read ports) from the other one of the two available read ports. However, in this worst case scenario, both R1 and R9 are stored in the same memory cell as R5 (e.g., the second memory cell of GPR 40). This means that when the single read port of the second memory cell of GPR 40 is being used to read value R5, one of the two available read ports of GPR 40 is being used. In this example, processing element 38A or conflict resolver unit 48 may not be able to read values R1 or R9 using the other one of the two available read ports of GPR 40 because the single read port of the second memory cell of GPR 40 is being used.

In the techniques described in this disclosure, because neither R1 nor R9 can be read simultaneously with R5, conflict resolver unit 48 or processing element 38A may read a value of the next instruction from a memory cell that is currently not be read from. For instance, the next instruction is R2=R2*R6+R10. As described above, R2, R6, and R10 are all stored in the third memory cell of GPR 40. In some examples, conflict resolver unit 48 or processing element 38A may read one of values R2, R6, or R10 (assume R10) during the execution of the instruction to read values R0 and R5, and store R10 in pre-fetch queue 44A.

In this example, the original instruction of R0=R0*R4+R8 may have included a sub-instruction to read R0, R4, and R8 from the three read ports (SRC0-SRC2). For instance, the sub-instruction may be: read R0 (SRC0), R4 (SRC1), R8 (SRC2). In accordance with the techniques described in this disclosure, conflict resolver unit 48 or control unit 33 may modify the instruction (e.g., the above sub-instruction) so that the sub-instruction is as follows: read R0 (SRC0), R5 (SRC1), R10 (SRC2). In this way, conflict resolver unit 48 or control unit 33 may modify the instruction to include an instruction to read at least one value from a second, different memory cell of GPR 40. For instance, the original instruction required reading three values from the same memory cell, and the modified instruction requires reading R5 and R10 from different memory cells of GPR 40, where the R5 and R10 values from the different memory cells of GPR 40 are operands for subsequent instructions. In this example, R5 is an operand for the subsequent instruction R1=R1*R5+R9, and R10 is an operand for another subsequent instruction R2=R2*R6+R10.

The reason for the modification to the sub-instruction is because conflict resolver unit 48 may have stored values R4 and R8 into conflict queue 42A prior to execution. Also, during execution only SRC0 will be used, meaning that SRC1 and SRC2 are free because values R4 and R8 were previously stored in conflict queue 42A. Therefore, in this example, conflict resolver unit 48 may modify the sub-instruction to read R5 with SRC1, instead of read R4 with SRC1. Also, because R9 cannot be read in parallel with R5 (both being in the same memory cell), conflict resolver unit 48 may modify the sub-instruction to read R10 with SRC2, instead of read R8 with SRC2.

In this manner, during execution of the modified instruction (i.e., modified sub-instruction), processing element 38A may read at least one value from the first memory cell (e.g., the R1 value) and at least one value from the second memory cell (e.g., the R5 value) of GPR 40. Processing element 38A may store the at least one value from the second memory cell (e.g., the R5 value) of GPR 40 in pre-fetch queue 44A of processing element 38A. Arithmetic pipeline 46A of processing element 38A may read from pre-fetch queue 44A for implementing an operation defined by the subsequent instruction as part of executing the subsequent instruction. For example, arithmetic pipeline 46A may read from pre-fetch queue 44A to implement the operation R1=R1*R5+R9 as part of executing the subsequent instruction of R1*R5+R9.

The above example was described with respect to the first three instructions for R0, R1, and R2 for reading values R0, R4, R8, R5, and R10. Conflict resolver unit 48 may perform similar steps for reading the other values. For instance, conflict resolver unit 48 may directly or may cause processing element 38A to read values R9 for storage in conflict queue 42A because processing element 38A can read value R1 during execution, and value R5 was previously stored in pre-fetch queue 44A.

In this way, the following pseudo-code illustrates the instructions (as modified) that processing element 38A may execute. For ease of illustration, the instructions that processing element 38A or conflict resolver unit 48 execute to store values in conflict queue 42A are not shown. In other words, it should be understood that when processing element 38A executes the below instructions, some of the values needed for implementing the instructions have already been stored in conflict queue 42A, and the below instructions only show those values that have yet to be read. For instance, in the below instructions, the storage of values R4 and R8 is not illustrated because values R4 and R8 were already stored in conflict queue 42A prior to the execution of the instruction.

Cycle 0: read R0 (SRC0), R5 (SRC1), R10 (SRC2)
Cycle 1: read R1 (SRC0), R6 (SRC1), R11 (SRC2)
Cycle 2: read R2 (SRC0), R7 (SRC1)
Cycle 3: read R3 (SRC0).

The above example can be extrapolated further. For instance, as described above, value R0 may represent an attribute for four pixels (e.g., as illustrated in FIG. 3B, R0 represents the red-component for pixels P0-P3). The same may be true for values R1-R11 (e.g., each value represents an attribute for four pixels). In some instances, processing element 38A may execute the above sub-instructions from cycle 0 to cycle 3 twice to process pixels P0-P7.

As illustrated above, for cycle 2 and cycle 3, not all read ports are being utilized. In some examples, for cycle 2 and cycle 3, additional read operations can be utilized to read pixel values for the next grouping of pixels. For instance, if the above sub-instructions are for pixels P0-P7, additional read operations may be added to cycle 2 and cycle 3 for pixels P8-P15.

For instance, the sub-instructions may be as follows:
Cycle 0: read R0 (SRC0), R5 (SRC1), R10 (SRC2)
Cycle 1: read R1 (SRC0), R6 (SRC1), R11 (SRC2)
Cycle 2: read R2 (SRC0), R7 (SRC1), R8 (SRC2)//Here R8 is for P8-P15, again, as described above, R8 for P0-P7 was already stored in conflict queue 42A
Cycle 3: read R3 (SRC0), R4 (SRC1), R9 (SRC2)//Here R4 and R9 are for P8-P15, again, as described above, R4 and R9 for P0-P7 were already stored in conflict queue 42A
Cycle 4: read R0 (SRC0), R5 (SRC1), R10 (SRC2)//Here R0, R5, and R10 are all for P7-P15
Cycle 5: read R1 (SRC0), R6 (SRC1), R11 (SRC2)//Here R1, R6, and R11 are all for P7-P15
Cycle 6: read R2 (SRC0), R7 (SRC1)//Here R2 and R7 are for P7-P15
Cycle 7: read R3 (SRC0)//Here R3 is for P7-P15

Once all of the values for an instruction are available, arithmetic pipeline 46A may perform the operation defined by the instruction. In some examples, arithmetic pipeline 46A may receive the values from the read operation executed by processing element 38A and/or via one or more both of conflict queue 42A and pre-fetch queue 44A. For instance, to implement the R0=R0*R4+R8 Mad operation, arithmetic pipeline 46A may receive the R0 value as part of the read instruction that processing element 38A executes, and may receive the R4 and R8 values from conflict queue 42A. As another example, to implement the R1=R1*R5+R9 Mad operation, arithmetic pipeline 46A may receive the R1 value from the read operation that processing element 38A executes, receive the R5 value from pre-fetch queue 44A (e.g., where the R5 value was read along with the R0 value), and receive the R9 value from conflict queue 42A.

Because arithmetic pipeline 46A may receive values from different sources (e.g., as part of read, from conflict queue 42A, or from pre-fetch queue 44A), arithmetic pipeline 46A may include a plurality of multiplexers from which the correct input can be selected. For instance, control unit 33 may output a signal to the selection input of the multiplexers within arithmetic pipeline 46A so that the operands are correctly selected from the read operation, conflict queue 42A, or pre-fetch queue 44A.

As described above, conflict resolver unit 48 may be configured to cause processing element 38A to read a value from GPR 40 prior to execution of the instruction that would cause the conflict. The following describes one example way in which conflict resolver unit 48 may perform such functions. Control unit 33 may be considered as a scheduler that schedules when instructions are to be executed.

Conflict resolver unit 48 may pick one entry (TAG ID 0 or 1) and may set dirty bit for the selected entry. Conflict resolver unit 48 may then issue a command to processing element 38A to read one of the operand values or directly read one of the operand values. Conflict resolver unit 48 may then acknowledge to control unit 33 that reading of the value has completed and send back tag ID "0/1." Control unit 33 then schedules the execution of the instruction with TAG ID "0/1." Control unit 33 instructs conflict resolver unit 48 to reset the dirty bit and release the entry.

As one example, assume that conflict queue 42A has two entries, entry 0 and entry 1, and both entries are available and there are two bits dirty flag D0 (TAG ID #0) and D1 (TAG ID #1) to represent entry 0 and entry 1, respectively.

In this example, for a first conflict for R0=R0+R4*R8, conflict queue 42A may need to use entry 0 and when access is granted, D0 will be set to 1. For another conflict for R1=R1+R5*R9, conflict queue 42A may need to use entry 1 and when access is granted, D1 will be set to 1. In this case, both entries are used. Then, for the next conflict, there may be some delay because both D0/D1 are 1. An instruction may issue TAG ID=1 as a token to carry through the execution to indicate where to retrieve the conflict operand, and after entry 1 of conflict queue 42A is ready, D1 can be set to 0, and entry 1 of conflict queue 42A is available to store another conflict operand.

Testing showed that the techniques described in this disclosure may be advantageous relative to some other techniques. For instance, as a comparison between a single memory cell with multiple ports GPR (e.g., six ports 2W4R) and a GPR with multiple memory cells with few ports (e.g., four 1W1R) showed that there is an average saving of 18% routed data and a performance increase of 5%-10%. Moreover, although the above example techniques are described with respect to 1W1R memory cells, the techniques may be extended to other types of memory cells such as 1W2R, pseudo 1W1R, and other such memory cells.

Figure 5:
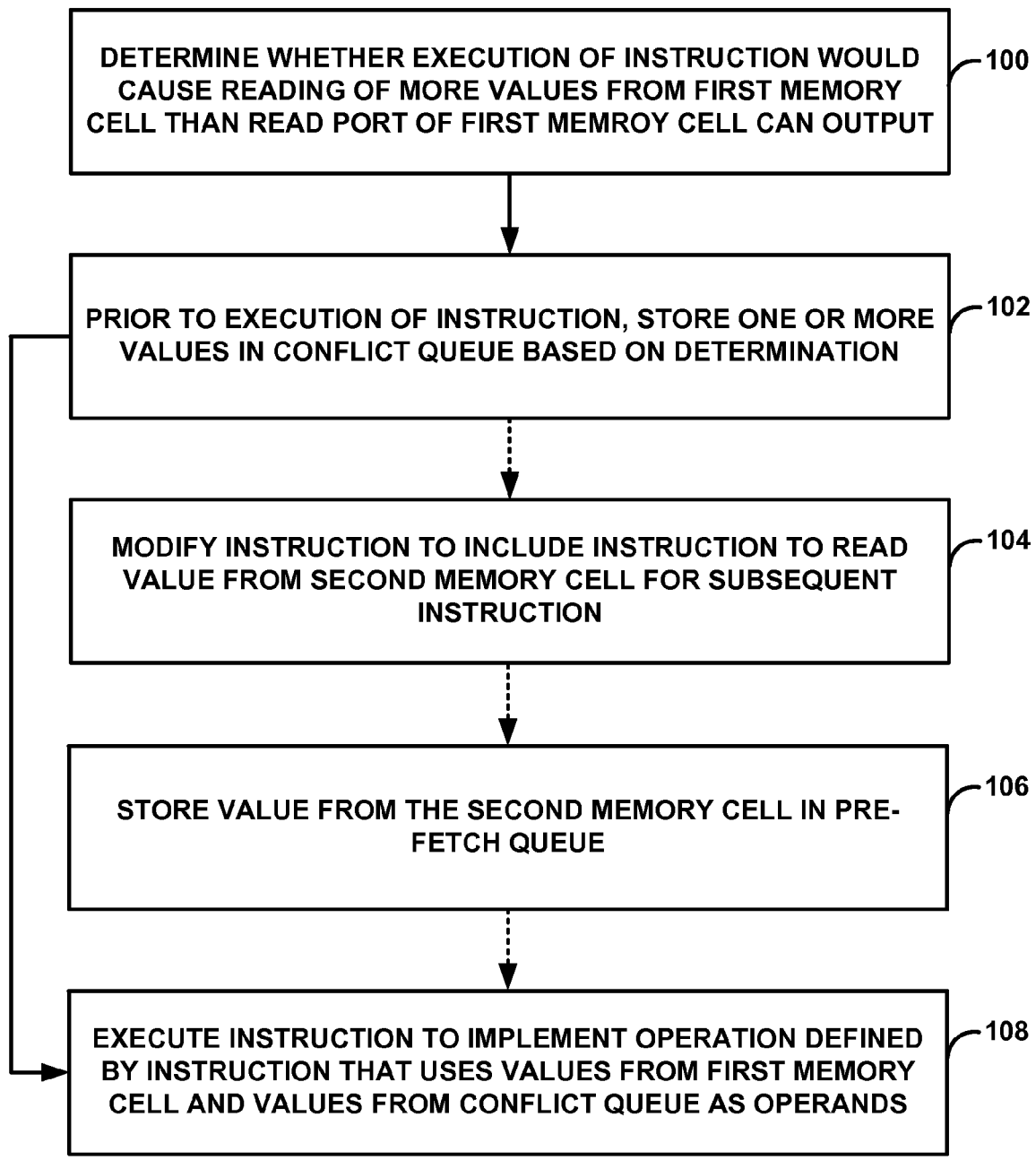
FIG. 5 is a flowchart illustrating an example method of operation in accordance with one or more examples described in this disclosure.

FIG. 5 is a flowchart illustrating an example method of operation in accordance with one or more examples described in this disclosure. As illustrated, GPU 14, via conflict detection unit 34 of shader core 31, may determine whether execution of an instruction would cause simultaneous reading of more values from a first memory cell of GPR 40 than a read port of the first memory cell can output (100). For instance, the memory cells of GPR 40 may include only a single read port and only a single write port.

In such examples, a memory cell of GPR 40 may be only able to output one value via the single read port of the memory cell, and conflict detection unit 34 may determine whether execution of an instruction would cause simultaneous reading of two or more values from the first memory cell, which would be more values than the read port of the first memory cell can output. As an example, as described above, the execution of R0=R0*R4+R8 would require simultaneous reading of three values (e.g., R0, R4, and R8) from a first memory cell of GPR 40, which is more than a read port of the first memory cell can output (e.g., the read port of the first memory cell can output one value, but executing the instruction would result in three values being outputted by the read port at the same time).

Prior to execution of the instruction, GPU 14, via conflict resolver unit 48 or processing element 38A, may store one or more values stored in the first memory cell in conflict queue 42A based on the determination that execution of the instruction would cause simultaneous reading of more values from the first memory cell than the read port of the first memory cell can output (102). For instance, as described above, conflict resolver unit 48 or processing element 38A may store values R4 and R8 in conflict queue 42A prior to execution of R0=R0*R4+R8. Conflict queue 42A is separate from GPR 40. For instance, processing element 38A includes conflict queue 42A.

In this example, conflict resolver unit 48 may determine an instance when all of the reading ports of GPR 40 are not in use and when one or more values are not being read from the first memory cell. Conflict resolver unit 48 or processing element 38A may store the one or more values stored in the first memory cell in conflict queue 42A during the determined instance. For example, although each memory cell of GPR 40 may have limited ports (e.g., only one read port and only one write port), GPR 40 itself may have a plurality of ports as set by input and output crossbars such as input crossbar 30 and output crossbar 32. In this case, if all of the outputs of the output crossbar of GPR 40 are not being used, and first memory cell of GPR is not being accessed, conflict resolver unit 48 or processing element 38A may be able to read R4 or R8 values from the first memory cell and store the value in conflict queue 42A for later execution of the R0=R0*R4+R8 instruction.

In some examples, GPU 14, via shader core 31 and processing element 38A, may execute the instruction to implement an operation defined by the instruction that uses values from the first memory cell and values from conflict queue 42A as operands (108). For instance, processing element 38A may execute the instruction R0=R0*R4+R8 to implement the MAD (multiply-and-add) operation defined by the instruction. In this example, arithmetic pipeline 46A uses at least one value from the first memory cell of GPR 40 (e.g., R0) and at least one value from conflict queue 42A (e.g., R4 and R8) as operands.

In the techniques described in this disclosure, rather than immediately execute the instruction to implement the operation defined by the instruction, conflict resolver unit 48 and/or control unit 33 may modify the instruction to include an instruction to read at least one value from a second, different memory cell of GPR 40 (104). The value from the second memory cell of GPR 40 is an operand for a subsequent instruction. For instance, control unit 33 or conflict resolver unit 48 may modify the read R0, R4, R8 instruction to read R0, R5, R10, where the R5 and R10 values are operands for a subsequent instruction. In this example, processing element 38A may read at least one value from the first memory cell (e.g., R0) and at least one value from the second memory cell (e.g., R5) during execution of the modified instruction.

In some examples, control unit 33 or conflict resolver unit 48 may modify the instruction to read at least one value from a second memory cell of GPR 40 if not all ports of GPR 40 are being used and if a read port of the second memory cell is not being used. For instance, processing element 38A may read values R5 and R10 if not all read ports of GPR 40 are being used (which would be the case because values R4 and R8 are no longer being read from GPR 40) and if a read port of the second memory cell is not being used. As an example, because the read port of the second memory cell is being used to read the R5 value, processing element 38A may not read the R9 value simultaneously with the R5 value.

GPU 14, via processing element 38A or conflict resolver unit 48, may store the value from the second memory cell in pre-fetch queue 44A of processing element 38A (106). Processing element 38A may read from pre-fetch queue 44 for implementing an operation defined by the subsequent instruction as part of execution the subsequent instruction. For instance, to implement R1=R1*R5+R9, arithmetic pipeline 46A may read the R5 value from pre-fetch queue 44A.

In some examples, after storing the value from the second memory cell in pre-fetch queue 44A, the value may remain stored in pre-fetch queue 44A. Processing element 38A may execute the instruction to implement the operation defined by the instruction that uses values from the first memory cell and values from conflict queue 42A (108). Then, during execution of the subsequent instruction, processing element 38A may use one or more of values read from the second memory cell, values stored in conflict queue 42A, and/or values stored in pre-fetch queue 44A.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing values, the method comprising:
   determining whether execution of an instruction would cause simultaneous reading of more values from a first memory cell of a plurality of memory cells of a general purpose register (GPR) than a read port of the first memory cell can output, wherein values stored in the first memory cell cannot be accessed via any of the other memory cells of the GPR;

prior to execution of the instruction, storing one or more values stored in the first memory cell in a conflict queue separate from the GPR based on the determination that execution of the instruction would cause simultaneous reading of more values from the first memory cell than the read port of the first memory cell can output;

modifying the instruction by including a sub-instruction in the instruction to read at least one value from a second, different memory cell of the GPR, wherein the at least one value from the second memory cell of the GPR is an operand for a subsequent instruction;

executing the modified instruction to implement an operation that uses at least one value from the first memory cell and at least one value from the conflict queue as operands, wherein executing the modified instruction includes executing the sub-instruction for reading the at least one value from the second memory cell of the GPR;

storing the at least one value from the second memory cell of the GPR in a pre-fetch queue of a processing element; and executing the subsequent instruction based on the at least one value stored in the pre-fetch queue of the processing element.

2. The method of claim 1, further comprising:
reading the at least one value from the first memory cell and the at least one value from the conflict queue during execution of the modified instruction.

3. The method of claim 1, further comprising:
reading from the pre-fetch queue to implement an operation defined by the subsequent instruction when executing the subsequent instruction.

4. The method of claim 1, wherein modifying the instruction comprises modifying the sub-instruction to read the at least one value from the second memory cell of the GPR if not all ports of the GPR are being used and if a read port of the second memory cell is not being used.

5. The method of claim 1, wherein storing the one or more values stored in the first memory cell in the conflict queue comprises:
determining an instance when all reading ports of the GPR are not in use and when one or more values are not being read from the first memory cell; and
storing the one or more values stored in the first memory cell in the conflict queue during the determined instance.

6. The method of claim 1, wherein each of the memory cells in the GPR comprises only one read port and only one write port.

7. The method of claim 1, wherein storing the one or more values comprises storing the one or more values stored in the first memory cell in the conflict queue of a processing element based on the determination that execution of the instruction would cause simultaneous reading of more values from the first memory cell than the read port of the first memory cell can output.

8. A device for processing values, the device comprising:
a general purpose register (GPR) comprising a plurality of memory cells that includes a first memory cell having a read port, wherein values stored in the first memory cell cannot be accessed via any of the other memory cells of the GPR; and
a graphics processing unit (GPU) configured to:
determine whether execution of an instruction would cause simultaneous reading of more values from the first memory cell than the read port of the first memory cell can output;

prior to execution of the instruction, store one or more values stored in the first memory cell in a conflict queue separate from the GPR based on the determination that execution of the instruction would cause simultaneous reading of more values from the first memory cell than the read port of the first memory cell can output;

modify the instruction by including a sub-instruction in the instruction to read at least one value from a second, different memory cell of the GPR, wherein the at least one value from the second memory cell of the GPR is an operand for a subsequent instruction;

execute the modified instruction to implement an operation that uses at least one value from the first memory cell and at least one value from the conflict queue as operands, wherein to execute the modified instruction, the GPU is configured to execute the sub-instruction for reading the at least one value from the second memory cell of the GPR;

store the at least one value from the second memory cell of the GPR in a pre-fetch queue of a processing element; and execute the subsequent instruction based on the at least one value stored in the pre-fetch queue of the processing element.

9. The device of claim 8, wherein the GPU comprises the GPR, and wherein the GPU comprises a processing element that includes the conflict queue.

10. The device of claim 8, wherein the GPU is configured to read the at least one value from the first memory cell and the at least one value from the conflict queue during execution of the modified instruction.

11. The device of claim 8, wherein the GPU is configured to read from the pre-fetch queue to implement an operation defined by the subsequent instruction when executing the subsequent instruction.

12. The device of claim 8, wherein to modify the instruction, the GPU is configured to modify the sub-instruction to read the at least one value from the second memory cell of the GPR if not all ports of the GPR are being used and if a read port of the second memory cell is not being used.

13. The device of claim 8, wherein to store the one or more values stored in the first memory cell in the conflict queue, the GPU is configured to:
determine an instance when all reading ports of the GPR are not in use and when one or more values are not being read from the first memory cell; and
store the one or more values stored in the first memory cell in the conflict queue during the determined instance.

14. The device claim 8, wherein each of the memory cells in the GPR comprises only one read port and only one write port.

15. A computer-readable storage medium having instructions stored thereon that when executed by one or more processors cause the one or more processors to:
determine whether execution of an instruction would cause simultaneous reading of more values from a first memory cell of a plurality of memory cells of a general purpose register (GPR) than a read port of the first memory cell can output, wherein values stored in the first memory cell cannot be accessed via any of the other memory cells of the GPR;

prior to execution of the instruction, store one or more values stored in the first memory cell in a conflict queue separate from the GPR based on the determination that execution of the instruction would cause simultaneous reading of more values from the first memory cell than the read port of the first memory cell can output;

modify the instruction by including a sub-instruction in the instruction to read at least one value from a second, different memory cell of the GPR, wherein the at least one value from the second memory cell of the GPR is an operand for a subsequent instruction;

execute the modified instruction to implement an operation that uses at least one value from the first memory cell and at least one value from the conflict queue as operands, wherein the instructions that cause the one or more processors to execute the modified instructions comprise instructions that cause the one or more processors to execute the sub-instruction for reading the at least one value from the second memory cell of the GPR;

store the at least one value from the second memory cell of the GPR in a pre-fetch queue of a processing element; and execute the subsequent instruction based on the at least one value stored in the pre-fetch queue of the processing element.

16. The computer-readable storage medium of claim 15, further comprising instructions that cause the one or more processors to:

read the at least one value from the first memory cell and the at least one value from the conflict queue during execution of the modified instruction.

17. The computer-readable storage medium of claim 15, wherein the instructions that cause the one or more processors to store the one or more values stored in the first memory cell in the conflict queue comprise instructions that cause the one or more processors to:

determine an instance when all reading ports of the GPR are not in use and when one or more values are not being read from the first memory cell; and store the one or more values stored in the first memory cell in the conflict queue during the determined instance.

18. The computer-readable storage medium of claim 15, wherein each of the memory cells in the GPR comprises only one read port and only one write port.

19. The computer-readable storage medium of claim 15, wherein the instructions that cause the one or more processors to store the one or more values comprise instructions that cause the one or more processors to store the one or more values stored in the first memory cell in the conflict queue of a processing element based on the determination that execution of the instruction would cause simultaneous reading of more values from the first memory cell than the read port of the first memory cell can output.

20. A device for processing values, the device comprising:

a general purpose register (GPR) comprising a plurality of memory cells that includes a first memory cell having a read port, wherein values stored in the first memory cell cannot be accessed via any of the other memory cells of the GPR; and a graphics processing unit (GPU) comprising:

means for determining whether execution of an instruction would cause simultaneous reading of more values from the first memory cell than the read port of the first memory cell can output;

means for storing, prior execution of the instruction, one or more values stored in the first memory cell in a conflict queue separate from the GPR based on the determination that execution of the instruction would cause simultaneous reading of more values from the first memory cell than the read port of the first memory cell can output;

means for modifying the instruction by including a sub-instruction in the instruction to read at least one value from a second, different memory cell of the GPR, wherein the at least one value from the second memory cell of the GPR is an operand for a subsequent instruction;

means for executing the modified instruction to implement an operation that uses at least one value from the first memory cell and at least one value from the conflict queue as operands, wherein the means for executing the modified instruction includes means for executing the sub-instruction for reading the at least one value from the second memory cell of the GPR;

means for storing the at least one value from the second memory cell of the GPR in a pre-fetch queue of a processing element; and means for executing the subsequent instruction based on the at least one value stored in the pre-fetch queue of the processing element.

* * * * *